United States Patent [19]

Zauderer

[11] Patent Number: 6,048,510
[45] Date of Patent: *Apr. 11, 2000

[54] METHOD FOR REDUCING NITROGEN OXIDES IN COMBUSTION EFFLUENTS

[75] Inventor: Bert Zauderer, Merion Station, Pa.

[73] Assignee: Coal Tech Corporation, Merion Station, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/941,028

[22] Filed: Sep. 30, 1997

[51] Int. Cl.⁷ ..................................................... B01D 53/56
[52] U.S. Cl. ............................................................. 423/235
[58] Field of Search ............................. 423/235; 266/225, 266/226

[56] References Cited

U.S. PATENT DOCUMENTS

| | | | |
|---|---|---|---|
| 3,900,554 | 8/1975 | Lyon | 423/235 |
| 4,208,386 | 6/1980 | Arand et al. | 423/235 |
| 4,624,191 | 11/1986 | Zauderer et al. | 110/64 |
| 4,750,716 | 6/1988 | Reeve-Parker | 266/255 |
| 4,751,065 | 6/1988 | Bowers | 423/235 |
| 4,756,890 | 7/1988 | Tang et al. | 423/235 |
| 4,765,258 | 8/1988 | Zauderer | 110/347 |
| 4,780,289 | 10/1988 | Epperly et al. | 423/235 |
| 5,048,432 | 9/1991 | Hofmann et al. | 110/345 |
| 5,165,903 | 11/1992 | Hunt et al. | 423/239 |
| 5,252,298 | 10/1993 | Jones | 422/172 |
| 5,315,941 | 5/1994 | Vetterick et al. | 110/345 |
| 5,342,592 | 8/1994 | Peter-Hoblyn et al. | 423/235 |
| 5,465,690 | 11/1995 | Viel Lamare et al. | 122/4 D |
| 5,478,542 | 12/1995 | Chawla et al. | 423/235 |

OTHER PUBLICATIONS

Wood, 'Select the Right NOx Control Technology', Chemical Engineering Progress, pp. 32–38, Jan. 1994.

Knowlton et al., 'The Importance of Storage, Transfer, and Collection', Chem. E Progress, pp. 44–54, Apr. 1994.

*Primary Examiner*—Gary P. Straub
*Assistant Examiner*—Timothy C. Vanoy
*Attorney, Agent, or Firm*—Whitham, Curtis & Whitham

[57] ABSTRACT

Method for reducing nitrogen oxides ($NO_x$) in the gas stream from the combustion of fossil fuels is disclosed. In a narrow gas temperature zone, $NO_x$ is converted to nitrogen by reaction with urea or ammonia with negligible remaining ammonia and other reaction pollutants. Specially designed injectors are used to introduce air atomized water droplets containing dissolved urea or ammonia into the gaseous combustion products in a manner that widely disperses the droplets exclusively in the optimum reaction temperature zone. The injector operates in a manner that forms droplet of a size that results in their vaporization exclusively in this optimum $NO_x$-urea/ammonia reaction temperature zone. Also disclosed is a design of a system to effectively accomplish this injection.

13 Claims, 3 Drawing Sheets

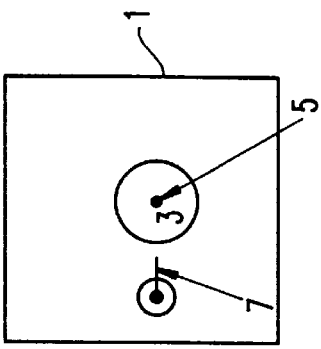
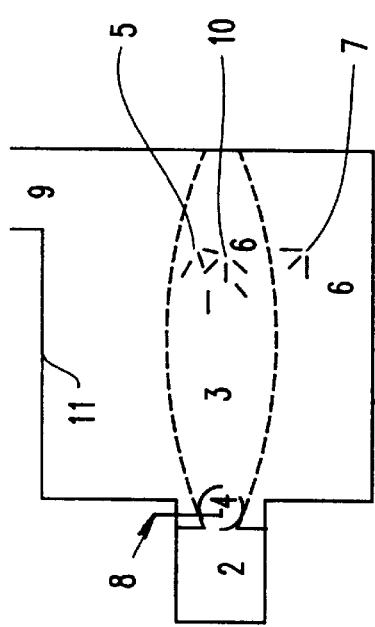
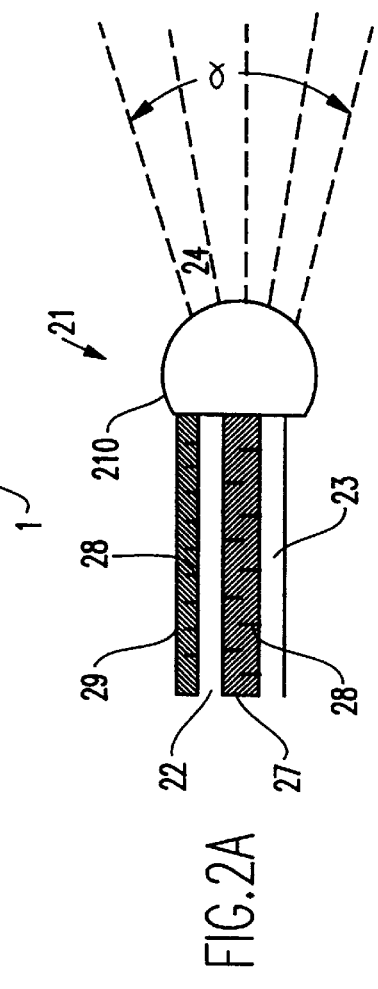
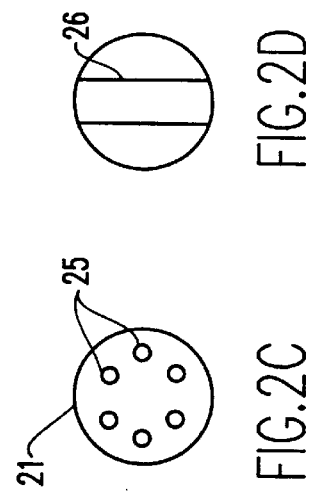
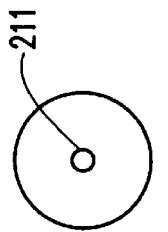
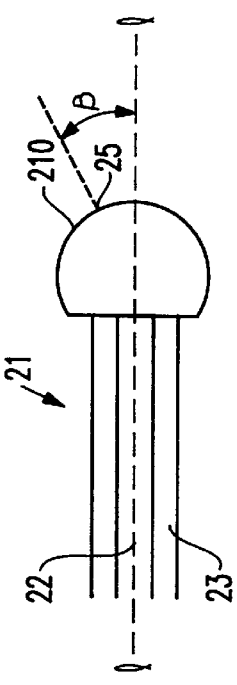

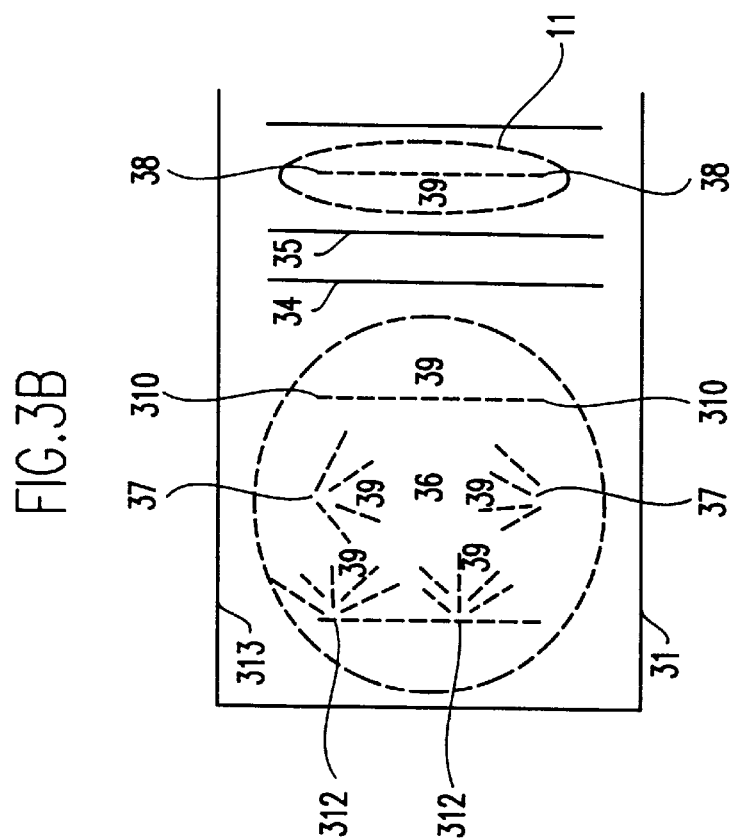
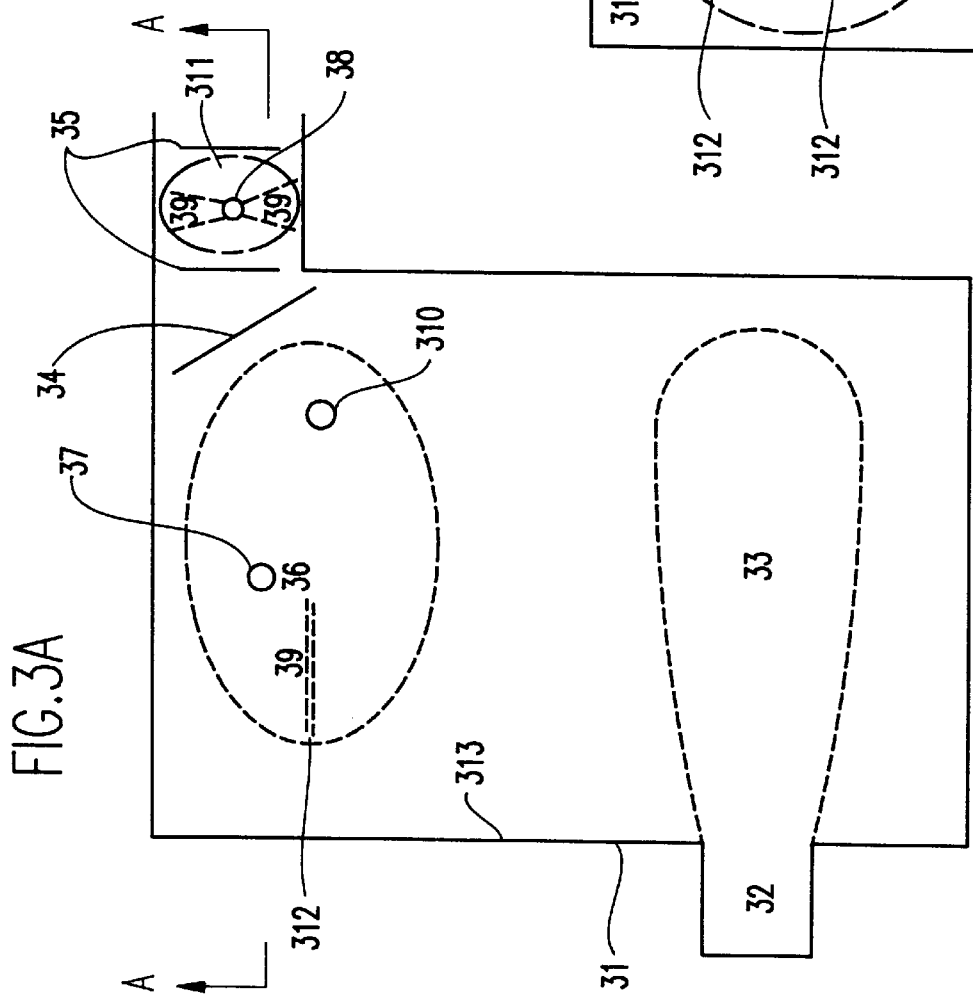
FIG.3A
FIG.3B

METHOD FOR REDUCING NITROGEN OXIDES IN COMBUSTION EFFLUENTS

This invention was made with Government support under contract DE-AC22-91PC91162 awarded by the Department of Energy.

BACKGROUND OF THE INVENTION

1. Field of the Invention

The present invention generally relates to improvements in the combustion of carbonaceous fuels, and, more particularly, to improvements in steam generating systems having firing boilers with reduced emissions of nitrogen oxides while minimizing production of other pollutants.

2. Description of the Prior Art

The combustion of fossil fuels leads to the formation of $NO_x$, a pollutant that leads to smog and acid rain, especially in urban environments. There are two sources of $NO_x$, one is primarily formed during the combustion of solid fossil fuels, namely coal. The fuel bound nitrogen whose concentration is generally in the range of 1%, by weight, in the coal is the primary source of $NO_x$ in coal combustion. Additionally, combustion with oxygen in excess of the amount required for stoichiometric combustion, which is required for all fossil fuels to minimize other pollutants, such as carbon monoxide, results in the formation of thermal $NO_x$. The thermal $NO_x$ concentration rises substantially at temperatures above about 3000° F.

Coal is the primary fuel for utility boilers, and to efficiently burn it, requires combustion at 3000° F. or higher. Consequently, both fuel bound and thermal $NO_x$ form in high concentration, especially in large coal fired boilers used in electric utility power plants. Several technologies are used to control the emissions of $NO_x$ from fossil, and especially coal, fired boilers. Among these control technologies are: Staged combustion in which initial fuel rich-combustion near the fuel injection zone is followed by excess air combustion in the furnace region of the boiler. There are a number of different staged combustion processes and system designs, depending on the boiler design. Another $NO_x$ control process is catalytic reduction in which the relatively cold combustion effluent of several 100° F. is passed over a catalyst coated bed in the presence of ammonia. This process is called selective catalytic reduction, SCR. Another process, generally called selective non-catalytic reduction (SNCR), involves the injection of various chemical compounds, primarily urea or ammonia, with or without various chemical additives, into the combustion gases in the boiler furnace at temperatures at which the $NO_x$ to $N_2$ reaction is favored. The method of the present invention falls within the field of SNCR processes. While all these $NO_x$ control processes reduce $NO_x$ emissions to varying degrees, they all have certain technical and economic disadvantages. For example, staged combustion results in unburned carbon in the fly ash, which represents an energy loss and may make the fly ash unsuitable for recycling. Also in a certain staged combustion design, called low $NO_x$ burners, chemical compounds can form that corrode boiler metal tubes. SCR requires costly catalyst structures, and regular catalyst replacement. The present invention discloses a SNCR method, whose background art will be discussed in the next section. The present invention eliminates some of the technical and economic disadvantages in prior art $NO_x$ control methods, primarily in prior art of SNCR of $NO_x$.

As discussed above, there is an extensive prior art on different $NO_x$ reduction methods in fossil fuel fired combustion systems. The prior art of direct relevance to the present invention is in the use of selective non-catalytic reduction (SNCR) of $NO_x$.

An early disclosure of non-selective catalytic reduction is U.S. Pat. No. 3,900,554 to Lyon describing a method for reducing the concentration of NO in combustion effluents in the presence of oxygen using ammonia or a precursor thereof. Although the Lyon patent indicates that the ammonia is contacted with the effluent at a temperature where they mix of 1600 to 2000° F., the patent fails to reveal how the procedure might be performed inside the combustion zone of a boiler. In U.S. Pat. Nos. 4,208,386 and 4,325,924, Arand discloses the injection of urea into the combustion zone of a fossil fuel fired boiler. The preferred injection temperature is stated as 1900° F., with an allowable range of 1600° F. to 2000° F. Above 2000° F. additional $NO_x$ is formed. The use of a reducing agent, such as hydrogen is stated as allowing the SNCR reaction to proceed at temperatures as low as 1300° F. In the burner zone of a boiler the temperature is generally in the range of 3000° F. Therefore, the urea injection must take place far away from this zone, presumably at the end of the radiative section of the boiler. Since a large utility boiler can operate over a wide fuel input range as customer electric power requirements change during the day, the temperature at the preferred point of injection can change. Therefore, Arand discloses the use of additives or injection of reducing gases, such as hydrogen, with the urea to allow the SNCR process to proceed with $NO_x$ to $N_2$ conversion if the temperature at the point of urea injection changes with boiler load variation. However, as in Lyon, the Arand patents fail to reveal how the procedure might be performed inside the combustion zone of a boiler. Arand does not teach actual means of injection of the urea-water solution insofar as to droplet sizes or injection means. The allowable residence times taught by Arand of from 0.001 to 10 seconds is dubious, namely, the lower range is much too short, while the latter range is much too long for residence times in the proper temperature range of an industrial or utility boilers ranging from 10,000 lb/hr of steam production to over 100 MW power production.

Despite such objectives in the prior art, there remains a great need for possible techniques and related wherewithal for actually implementing an effective injection of reducing agents, while in an appropriate physical state for the reduction reaction, into contact with combustion effluents at the critical temperature range in the combustion zone of a boiler. Injection of urea or ammonia outside the temperature range at which it is effective in converting (reducing) $NO_x$ to $N_2$, or inadequate mixing of the urea or ammonia in the proper temperature zone, results in excess ammonia being conveyed to cooler portions of the combustion gas effluent gas stream. In coal fired boilers, this excess ammonia can combine with the sulfur in the gas stream to form ammonium sulfate or ammonium bisulfate. The former may contribute to stack plume formation, while the latter can foul air heater surfaces. (*Steam, Its Generation & Use*, 40th Edition, Chapter 40, Babcock & Wilcox Company, New York, N.Y., 1992) Also the ammonia may attach to fly ash, rendering it unfit for beneficial use. To prevent these results, the free ammonia in the gas downstream of the injection zone must be limited to less than 10 parts per million by volume (ppmv), and preferably less than 5 ppmv.

Other prior patents, for example, Pat. Nos. 4,719,092 and 4,751,065 to Bowers are representative of inventions that disclose use of various chemical additives to extend the temperature range of the urea/ammonia reaction with $NO_x$ to a wider temperature range than urea or ammonia by itself.

These patents also fail to provide concrete teachings of how an implementation might be carried out to inject the urea into the effluent in a proper physical state and temperature in order to obtain high $NO_x$ reduction with acceptably low ammonia in the effluent.

U.S. Pat. No. 5,252,298 to Jones teaches the use of an air or steam flow to atomize the aqueous urea solution inside an injection chamber, said chamber having an air flow that is used to entrain the atomized droplets and inject them into the boiler. These injectors are placed at multiple locations in the boiler wall and the resulting air jet is of such velocity that, according to Jones' use of gas dynamic theory of jets, the jet will reach the opposing wall of the boiler without substantial deflection from the combustion gas flow in the boiler. Jones admits that a significant percentage of atomized droplets will impact the wall inside the injection chamber. Thus the benefit of atomization is lost for this wall impacted liquid. Jones recognizes this and incorporated a "scrubber" to re-entrain this wall material, but he does not teach how this is accomplished or how effective it is. Furthermore, Jones stated purpose of having the jets emerging from his injectors into the boiler furnace is to achieve substantial mixing of these jets with the combustion gases in the furnace. However, if as he teaches, the jets travel to the far wall without significant deflection from the combustion gas stream, then mixing can be expected to be very limited.

Hunt U.S. Pat. No. 5,165,903 also teaches the use of multiple air atomized aqueous solutions of urea or ammonia to reduce $NO_x$ in a 100 MW coal fired boilers. This process is combined with initial $NO_x$ reduction with staged combustion using a low $NO_x$ coal burner with subsequent air injection into the furnace to reduce the $NO_x$. To further reduce $NO_x$, aqueous urea is injected into the gas stream in the boiler with multiple air atomized nozzles at a location where the gas temperature was 1420° F. to 1820° F. The nozzle design is not disclosed. The ammonia remaining from the urea injection is several times greater than the maximum allowable to limit the negative effect of ammonia at a low temperature, upstream of the stack gas baghouse. It is subsequently reduced to acceptable levels at the stack outlet, by a mechanism not disclosed, although a chemically active sodium reagent is injected upstream of the baghouse.

In subsequent tests by Hunt in the same 100 MW coal fired boiler, the ammonia remaining in the flue gas exhaust was too high to limit the deleterious effect of ammonia on the air heater and stack plume. As a result, the urea was first converted externally to the boiler into ammonia which was then injected in aqueous form into the boiler. ("Integrated Dry $NO_x/SO_2$ Emission Control System", T. Hunt and J. Doyle, *Proceedings Second Annual Clean Coal Technology Conference*, Page 821, U.S. Department of Energy, Atlanta, Ga., Oct. 18–22, 1992). This of course increases the cost of the process.

The difficulty of injecting a sorbent, such as urea, into a large boiler and achieving high $NO_x$ reduction without unacceptably high ammonia effluent at the stack is also illustrated by Hofmann ("$NO_x$ Control in a Brown Coal Utility Boiler", J. E. Hofmann et al., in Proceedings: 1989 Joint Symposium on Stationary Combustion $NO_x$ Control, Vol. 2, U.S. EPA, EPA-600/9-89-062b {NTIS PB89-220537}, 7A-pp. 53–66, (June 1989)). Aqueous urea was mixed with a proprietary additive and injected into a 150 MW boiler through 12 injector nozzles at one elevation in the boiler. Only 30% to 50% $NO_x$ reduction was achieved before the ammonia effluent reached the upper acceptable effluent limit of 10 ppm in the stack. The lower $NO_x$ figure applies with 10% addition of the proprietary enhancer, while the higher figure applies with 20% addition. A gas temperature profile over the boiler gas path cross-section at the elevation of the 12 injectors shows a cool outer ring from the boiler tube wall to a distance of about 8 to 12% of the square boiler width where the gas temperature was below 900° C. (1650° F.). The gas temperature increases in a series of concentric rings to 1050° C. (1921° F.) at the center of the boiler. Since utility boilers have peak water/steam temperatures of about 1000° F., the boiler wall temperature even with ash deposits on it will probably be at most a few 100° F. above the water/steam temperature. Therefore a zone of at least several feet will exist where the urea laden droplets can vaporize but where the temperature is below the optimum for urea reaction with $NO_x$. With the enhancers, this zone may be reduced somewhat. However, any urea vaporized in this boundary layer will be rich in ammonia which will preferentially flow out to the stack. The impact of this zone on the urea-$NO_x$ reduction process is not discussed by Hofmann. However, Jones in U.S. Pat. No. 5,252,298 states that at high temperature the non-catalytic reaction of urea or ammonia with $NO_x$ is very fast and that air atomized droplets cannot penetrate very far into a large combustion chamber.

The above citation illustrates the important role of proper injection of the aqueous urea or ammonia solutions into the hot combustion gas stream, and the various approaches and difficulties in achieving $NO_x$ reduction with acceptable ammonia effluent. Therefore, the statement by Epperly in U.S. Pat. No. 4,780,289 that the injection method of aqueous droplets for the SNCR application is "familiar to those skilled in the art" is clearly open to question.

In an attempt to solve the problem of ammonia in the effluent from the SNCR process, a number of prior inventors have proposed a two step process, namely SNCR followed by SCR. In the latter process, the ammonia is consumed in the catalytic reaction in which additional $NO_x$ is removed. Examples of dual $NO_x$ reduction disclosures are: U.S. Pat. Nos. 4,780,289 and 4,777,025 both to Epperly, and U.S. Pat. No. 5,465,690. While this achieves over 90% $NO_x$ reduction, it adds substantially to the cost of $NO_x$ removal. According to Jones in U.S. Pat. No. 5,240,689, it involves a capital investment of between $60 to $120/kW plus replacement of the catalyst every 1 to 2 years. Additionally, the excess ammonia reacts with the $SO_2$ from coal combustion to form ammonium bisulfate at 500° F. which fouls the boiler's air heaters. This temperature is higher than the temperature at which the SCR process operates, which is downstream of the air heater. These are issues not addressed in the above cited dual $NO_x$ reduction inventions.

In the invention by Hunt, U.S. Pat. No. 5,165,903, staged combustion was disclosed using "low $NO_x$" burners in pulverized coal, dry ash utility boilers to initially reduce the $NO_x$ before applying the SNCR process. The "low $NO_x$ burner" option is not available in utility boilers that use slagging coal combustors in which crushed coal is burned (*Steam, Its Generation & Use,* 37th Edition, Chapter 28, Babcock & Wilcox Company, New York, N.Y., 1960). These combustors must operate at excess air condition to burn the large coal particles, and as a result they emit high levels of $NO_x$, in excess of 1 lb/MMBtu.

U.S. Pat. No. 4,756,890 to Tang et al. describe reduction of $NO_x$ in a flue gas by mixing the reducing agent with the flue gas stream in a high-temperature cyclone separator located at the outlet of a boiler, such as a fluid bed boiler. The reason Tang et al. state for inserting injectors in the vortex region of a cyclone separator, and not in boilers per se, is in order for the $NO_x$ reduction reaction to take place at a location where there are no CaO particles carried over from the fluid of the fluid bed boilers. The specific construction of the injectors that might be useful to provide the described droplet sizes inside the cyclone, however, are not revealed by Tang et al.

U.S. Pat. No. 4,624,191 to Zauderer discloses a slagging cyclone combustor that utilizes finely crushed or pulverized coal that burns primarily in suspension in the combustor and can operate under fuel rich conditions needed for staged combustion and $NO_x$ control. At stoichiometric ratios of 70% to 80% in a 20 MMBtu/hr air cooled, slagging combustor designed according to this invention, with final combustion of the exhaust gas in the boiler, ("An Air Cooled Slagging Combustor with Internal Sulfur, Nitrogen, and Ash Control for Coal and High Ash Fuels", B. Zauderer, E. S. Fleming and B. Borck, *Proceedings First Annual Clean Coal Conference*, Page 6-3, U.S. DOE, Cleveland, Ohio, Sep. 22–24, 1992, Conf 920979) $NO_x$ emission were reduced well in excess of 50% compared to operation under excess air conditions. However, at these fuel rich conditions, unburned carbon over 10% of the total carbon in the coal was carried out of the combustor as fine particles entrained in the exhaust gas. Reducing the degree of fuel rich operation in the combustor greatly reduced the unburned carbon at the expense of increased $NO_x$ emissions. Therefore, this combustor is a candidate for dual $NO_x$ emission control in combination with SNCR.

As can be appreciated from the above, the achievement of extremely high $NO_x$ reduction, namely in excess of 90%, requires the use of the costly SCR process. Staged combustion results in unburned carbon carried out of the combustion zone at high levels of $NO_x$ reduction, and it is not suitable for crushed coal, cyclone combustor fired boilers. SNCR of $NO_x$ emission processes individually cannot achieve very high $NO_x$ reductions without the undesirable effect of increased ammonia effluents in exhaust stack gas, increased carbon monoxide emission when urea is used, and increased cost when combined with SCR processes. In addition, considerable difficulties and uncertainties are found in connection with the injection of aqueous solutions of urea or ammonia. The present invention discloses an effective approach to overcoming these difficulties and drawbacks associated with conventional SNCR processing.

SUMMARY OF THE INVENTION

The present invention discloses a method for the reduction of the concentration of nitrogen oxides ($NO_x$) in the products of combustion of a carbonaceous fuel, viz. a fossil fuel while minimizing production other pollutants such as ammonia slip, carbon monoxide, and/or residues formed from reaction of ammonia slip and $SO_2$.

In one embodiment, the method comprises injecting an aqueous solution into contact with an effluent gas stream at an effluent temperature of about 1700° F. to about 2000° F. in the presence of oxygen in a combustion gas zone of a boiler, in which the aqueous solution comprises a dissolved or dispersed reducing agent selected from urea, ammonia, or an ammonia precursor. Importantly, the aqueous solution, when brought into physical contact with the effluent gas stream, is in a liquid droplet form of a size sufficient to vaporize in the combustion gas zone.

More specifically, the method disclosed involves usage of air atomized water droplet injectors that are designed and operated in a way to disperse the reducing agent-containing liquid droplets in the effluent gas stream so as to restrict vaporization of these droplets to within the optimum gas temperature zone while avoiding premature vaporization of the droplets before they are brought into intimate mixing contact with the effluent gas stream. The reaction of urea or ammonia vapor molecules released within the droplet/effluent mixing zone with the $NO_x$ in the effluent gas stream converts the $NO_x$ to nitrogen ($N_2$).

BRIEF DESCRIPTION OF THE DRAWINGS

The foregoing and other objects, aspects and advantages will be better understood from the following detailed description of the preferred embodiments of the invention with reference to the drawings, in which:

FIGS. 1A and 1B are side and rear end view schematic drawings, respectively, of a 17,500 pound per hour package boiler to which a 20 million Btu per hour coal fired cyclone combustor is attached, and showing the placement of the droplet injectors of the aqueous solution of the reducing agent.

FIGS. 2A–E are schematic drawings of liquid droplet spray atomizers producing round or flat spray patterns.

FIG. 2A shows side view arrangement of parallel air and water feed pipes to the spray injector, while FIG. 2B shows the outlet ports for the round spray pattern from a single outlet port.

FIG. 2C shows the outlet ports for the round spray pattern from a multiple outlet ports.

FIG. 2D shows the outlet port for a flat spray pattern.

FIG. 2E shows a side view arrangement for concentric water and air feed pipes.

FIG. 3A shows a side view of the furnace and initial convective tube section of a large industrial or utility boiler, and FIG. 3B shows the cross-sectional view taken along line A—A in FIG. 3A of the furnace section and the placement of the aqueous urea or ammonia droplet injectors.

DETAILED DESCRIPTION OF THE PREFERRED EMBODIMENTS OF THE INVENTION

Figure 4:
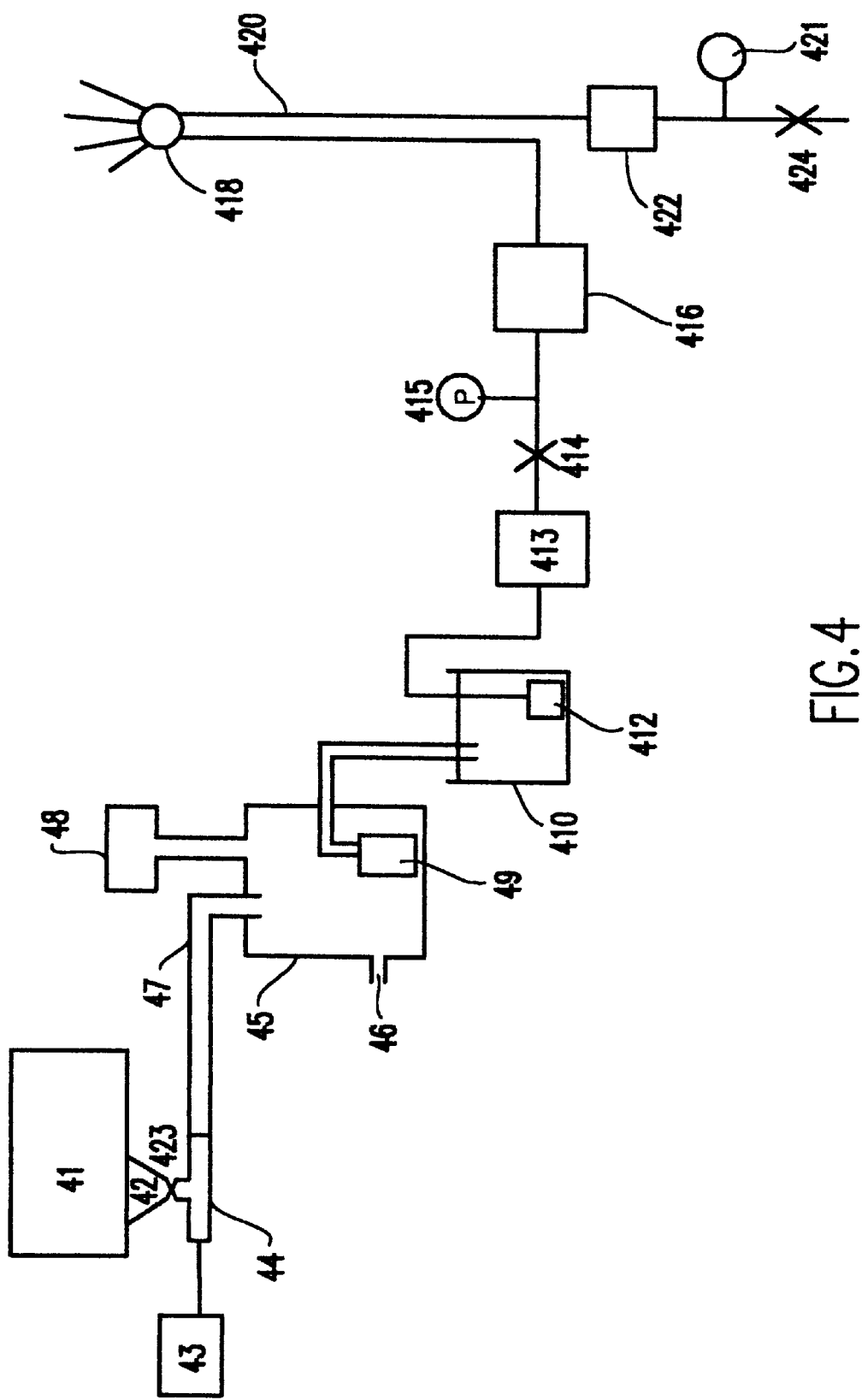
FIG. 4 shows a schematic drawing of one method for delivering the powdered urea and preparing the aqueous urea solution feed tank for feeding the droplet injectors.

The present invention describes a method for optimally introducing a chemical reducing agent for nitrogen oxides, preferably urea, into the combustion zone of a fossil fuel (e.g., coal, fuel oil)-fired utility boiler in a manner that assures the maximum utilization of the reducing agent to reduce nitrogen oxides in an oxygen-rich effluent gas stream of the boiler while eliminating or minimizing introduction of trace pollutants, such as ammonia or carbon dioxide, in the treated effluent gas stream exiting the boiler.

While this description of this invention will from time to time refer to urea as the reducing agent, by way of example, it will be understood that the reducing agent is not necessarily limited thereto, as it also is contemplated to encompass ammonia and ammonia precursors, such as ammonium carbonate, ammonium hydrazine, ammonium hydroxide, ammonium formate, and ammonium oxalate. All of these ammonia precursor compounds will yield ammonia upon vaporization. While ammonia is somewhat more effective in reducing $NO_x$, and less costly than urea, ammonia's toxicity and handling problems tend to make urea (also known as carbamide) the preferred material for the present invention. Also, the urea, ammonia, ammonia precursors, can be used alone as the reducing agent or in combination with each other. The reducing agent can be used in any amount permitted by its solubility in the carrier solution, typically water, although a preferred concentration of the urea ranges from about 1 to about 25% by weight.

Specifically, this invention addresses the very critical issue of assuring that the reducing agent, e.g. urea, which is introduced as aqueous droplets, is widely dispersed only in the temperature zone at which the $NO_x$ to $N_2$ conversion (reduction) reaction is optimum. This will assure that essentially all the urea reacts with the NO and essentially no ammonia or carbon monoxide remains in the gas stream from this reaction. Since it may not be feasible to reduce all the $NO_x$ to $N_2$ with this SCNR process alone, this process may be practiced in combination with other $NO_x$ reduction processes, such as staged combustion using low $NO_x$ burners in dry ash coal fired boilers, or entrained pulverized cyclone combustor boilers. Alternatively, this invention may be practiced in combination with SCR processes to eliminate $NO_x$, although this step may not be as economically desirable. Finally, this invention discloses a simple procedure by which crushed coal cyclone boilers, which cannot be operated fuel rich for $NO_x$ control under staged combustion conditions, can have their operating procedure modified to reduce $NO_x$ in combination with the present invention's SNCR method.

In practicing this invention, it is recognized that it is the urea that reacts with the $NO_x$, not the transport air and not the water droplet that contains the urea. Therefore, it is understood in the present invention that it is essential that the urea or other reducing agent molecules be widely dispersed in the effluent gas stream at the proper gas temperature to allow the urea molecule to react with the $NO_x$. For this reason, this invention avoids injection of urea as a fine dry powder which will not be very efficient because the powder will not readily break up into individual dispersed molecules. Nor will injection by injectors mounted at the wall of the furnace be 100% efficient because the droplets must traverse the cooled gas boundary layer region at the furnace wall before reaching the effluent gas in the proper temperature zone. In such a scenario, a least a part of the water droplets, undesirably, will vaporize before reaching and contacting the effluent gas stream, and the urea released in that intervening zone in such manner will not react with $NO_x$, and instead be conveyed by the combustion gases as ammonia to the stack (i.e., ammonia slip).

An important aspect of this invention is the successful design and usage of two-fluid injectors, viz. two-fluid atomizers, that will produce water droplets of a size distribution that results in droplet vaporization throughout the effluent combustion gas in the proper reactive gas zone of a boiler.

The transport of droplets is governed by the equations of motion for a spherical particle subject to aerodynamic drag. The vaporization of the droplet in a hot combustion zone is governed by the convective, radiative, conduction, and boiling heat transfer relations as described in standard texts on heat transfer, for example, see *Heat Transmission*, W. H. McAdams, (McGraw Hill, NY, 3rd Edition, 1954, or Heat, Mass, and Momentum Transfer, W. M. Rohsenow and H. Y. Choi (Prentice-Hall, Inc., Englewood Cliffs, N.J., 1961).

To practice this invention, the water droplet are injected at the about 1700 to about 2000° F. (about 927 to about 1093° C.), preferably about 1800 to about 2000° F. (about 982 to about 1093° C.), combustion gas temperature, where the urea-$NO_x$ reaction proceeds most efficiently. For purposes of this invention, the temperatures herein of the effluent gas stream are measured according to protocol set forth in the examples below.

It is imperative in this invention that adequate steps are taken to cool the compressed air used to atomize the liquid feed containing the reducing agent, e.g., urea, so that no preliminary vaporization of the liquid stream containing the reducing agent to produce steam occurs either inside the injector head (which leads to uneven flow within the injector), or in any "no man's land" space in the combustion zone of the boiler located between the injector head and the effluent gas stream to be treated (e.g., the above-mentioned cooled gas boundary layer region at the furnace wall).

Also, for process control in practicing this invention, the two key inputs include (1) an interface between a thermocouple located in the combustion zone of the boiler, and (2) an interface between the $NO_x$ measurement feedback signal acquired in the stack emissions after treatment of the combustion effluent with the liquid containing the urea and the urea feed concentration to the injector head. These process controls can be implemented and automatically managed using computer software and hardware, as one of ordinary skill will appreciate. These process controls are not exhaustive by any means, and one of ordinary skill will appreciate other possibly useful process control parameters, such as monitoring of the ammonia slip or carbon monoxide in the treated combustion effluent gas to adjust the distance of any spacing between the injector head and the effluent gas stream. For example, ammonia slip is detected, a control input could be generated to position the injector head closer to the combustion effluent gas stream to better ensure that the atomized feed is in liquid droplet form when it initially intercepts, contacts and interacts with the effluent gas stream.

The droplets, which are at ambient temperature (about 20–30° C.), are injected into the hot combustion gas and they will remain in the liquid phase until the droplet's temperature reaches 212° F. (100° C.). The droplet is heated by convection and radiation from the gas (radiation from the wall can be generally neglected in large furnaces) as it traverses the hot gas. The implementation of the present invention can be facilitated by reference to certain scientific principles. Namely, a rigorous analysis and characterization of the physical phenomena that the liquid droplets will undergo when brought into contact with a combustion gas has been applied by the inventor for purposes of facilitating the selection of the liquid droplet sizing that involves extensive heat and mass transfer analyses. Through these analyses, it is possible to facilitate the implementation of the present invention by examining the relative effects of the following phenomena:

The equation for convective heat transfer, Qv, to the liquid droplet, prior to its vaporization, is given by the following equation:

$$Qv = h^* A^* (T \text{ gas} - T \text{ drop}), \text{Btu/time}$$

where T gas is the gas temperature, preferably 1800–2000° F., T drop is the water droplet's surface temperature, between ambient and 212° F., A is the surface area of the droplet, and h is the convective heat transfer film coefficient at the droplet surface. For a spherical droplet, h can be computed from the dimensionless Nusselt number, Nu, which for small droplets of present interest is about equal to 2. The definition of the various dimensionless heat transfer terms can be found in standard engineering heat transfer books, such as McAdams, cited above, and will not be repeated here. The film coefficient, h, computed from Nu, is inversely proportional to the droplet diameter, Dp.

In addition, the droplet is also subjected to radiation from the furnace walls and the hot gas. The wall radiation can generally be neglected as compared to the gas radiation. Assuming a reasonable emissivity of 0.2 for the gas at a temperature of 2000° F. (1093° C.), then for droplets up to 100 microns the radiation contribution is less than 3% of the convective contribution. At 400 microns, it is 50%, while at 1000 microns it is 3 times greater than the convective term.

The next issue that must be addressed in connection with the water droplet sizing is the rate of penetration of the droplet's surface temperature into its interior as the droplet penetrates the combustion gas. Once the surface temperature reaches 212° F. (100° C.), the surface begins to boil. If the rate of penetration of temperature is extremely rapid, the droplet will most likely explode. Analytical solutions on the transient temperature penetration into a liquid or solid sphere are given in both McAdams and Rohsenow, cited above. The rate depends on two dimensionless numbers, the Fourier number, Fo, and the Biot number, Bi.

Fo is proportional to the thermal diffusivity of the water droplet and the time of penetration, and inversely proportional to the droplet radius squared. Bi is proportional to the product of the droplet radius and the combined surface convective and radiative film coefficient, h, as given above, and it is also inversely proportional to the thermal conductivity of water. Due to the low value of the thermal conductivity of water, the Biot number is equal to 0.1 when the contribution of radiation is negligible, and less when the radiation contribution is significant. In either case, the transient solution for spheres in the size range of 10 microns to 1000 microns as deduced from data curves in McAdams or Rohsenow, show that the surface temperature penetrates very slowly into the interior of the droplet. This is due to the low value of the water thermal conductivity.

This is a relevant observation because it indicates that the vaporization of the droplet will proceed from the surface into the interior. Therefore, to assure wide distribution of the dissolved urea in the water droplet, the droplet should be sized large enough to allow maximum penetration into the proper temperature zone. This will also minimize the number of injectors required in practicing this invention.

Next, in practicing this invention, the time required to vaporize various size water droplets is also determined and considered. This time may be estimated by computing the time required for the convective and radiative heat transfer to the droplet surface to boil the droplet, using about 1000 Btu/lb as the heat of vaporization. For droplets in the range from 10 microns to 1,000 microns, Table 1 shows that the time increases from 0.3 milliseconds for 10 microns to 92 milliseconds for 1,000 micron diameter droplets. As noted, since the vaporization appears to be a surface phenomena, the urea will be dispersed into the gas stream as the particle penetrates this stream. This is opposed to local explosive vaporization if the entire particle's temperature rapidly reached 212° F. (100° C.), which would have been the case if the Biot number had been much larger.

Having determined the heating process from the combustion gas to the water-urea droplet, the next step is to compute the fluid mechanic aspects of the droplet. As sphere flowing through a gas stream is subject to a drag coefficient which is a function of the Reynolds number of the droplet in the gas. As given by Rohsenow, the drag coefficient decreased from 10 for a 10 micron particle, to 4 at 50 microns, to 2 at 100 microns, to 1.5 at 400 microns, to 0.5 at 1,000 microns. These values apply to droplets injected at 176 feet per second into the 2000° F. (1093° C.) combustion gases.

The appropriate liquid droplet size to be created for injection into the combustion effluent gas stream is preferably chosen taking into consideration all the above-discussed factors to maximize the proportion of injected droplets that remain in the liquid state until brought into contact with the effluent gas and which will fully vaporize after such contact is made before the effluent gas stream ultimately exits the preferred urea-$NO_x$ reaction zone. Premature vaporization of the liquid droplets before contact is made with the effluent gas stream as well the incidence of non-completely vaporized droplets once infiltrating the effluent stream will lead to undesirable ammonia ($NH_3$) slip.

In demonstrating the invention in two different types of coal fired boilers in the Examples below, the present invention's SNCR method was combined with two different staged combustion $NO_x$ control methods. However, it is noted that the present invention's SNCR method can be combined with other $NO_x$ reduction processes and methods if desired.

The following non-limiting examples will further illustrate the present invention. All parts, ratios and percentages are based upon weight unless otherwise specified.

EXAMPLES

Certain types of air atomized injectors were particularly placed inside boilers by the inventor to demonstrate the invention. Air atomized, water droplet nozzles manufactured by the Spraying Systems Company, Wheaton, Ill., were used to practice this invention in the examples described herein.

Example 1

For a 17,500 lb/hr, saturated steam boiler 1, such as schematically shown in FIG. 1A, and manufactured by the Keeler Boiler Company in Williamsport, Pa. in 1970 for purposes of the examples summarized herein, one or two air atomized spray nozzles, as indicated below, were used. As indicated in FIG. 1A, a cyclone combustor 2 communicates with boiler 1 having furnace wall 11. In accordance with well-known practice, a pulverized coal is introduced along with primary (and any secondary) air into combustor 2. Zone 4 is where the gas temperature is about 2500° F., while zone 3, the combustion gas zone of the boiler 1, is where the effluent gas is at 1700–2000° F. and where it is to be treated according to this invention to reduce $NO_x$. An outlet 9 is provided through which the treated effluent gas passes to exit the boiler 1 and pass through any optional supplemental effluent treatment systems before it is discharged to the atmosphere. Various injectors 5, 7 and 10 are indicated. A spray pattern 6 of the atomized aqueous solution containing urea is created inside boiler 1. The placement of the nozzles within the boiler 1, indicated as elements 5, 7 and 10 in FIG. 1A will be elaborated below.

With reference to FIGS. 2A and 2E, the injector nozzles 5, 7 and 10 each have a pressurized air line 22 and a pressurized aqueous solution line 23, which feed to a chamber 210 assembly having internal passages to direct the air and aqueous solution to an atomizing mixing chamber and having one or more spray outlets 25, 26, 211 constituting one or more openings, depending on the spray patterns desired, such as shown in FIGS. 2C–D. In FIG. 2A, the air pipe 22 and the aqueous solution pipe 23 extend side-by-side parallel to one another, while in FIG. 2E, the air pipe 22 is arranged coaxial to and concentrically within the surrounding aqueous solution pipe 23. The chamber 210 has a convex rounded exterior surface, as indicated in FIGS. 2A and 2E. An aqueous solution containing the reducing agent (not shown), e.g., urea, mixes with the high pressure air in chamber 210, and then is discharged from the injectors 5, 7 and 10 as atomized liquid droplets 24. The injectors 5, 7 and 10 are thus two-fluid atomizers. Although not shown in the figures, copper gaskets, instead of Teflon™ gaskets, are preferred for use inside the chamber assembly at the plane where the air and aqueous solution are directed to the atomizing/mixing chamber inside assembly 210. Teflon™ gaskets tend to degrade from prolonged exposure to the high ambient boiler temperatures.

In any event, the droplet laden air 24 flows out of the chamber 210 and into the zone 3 where it intercepts the combustion effluent gas stream at the optimal temperature for the reduction reaction (e.g., between 1700 to 2000° F.). One spray pattern is a round spray in which the droplet laden air exits from a single orifice 211 out of the mixing chamber 210, as shown in FIG. 2B. This produces a very narrow spray angle α for the droplet spray 24 shown in FIG. 2A. A wider spray angle α can be achieved by using an outlet having a series of orifices 25 placed equidistantly at an angle β of 60° to 70° to the nozzle's longitudinal axis 1—1, such as shown in FIG. 2E (although equally applicable to the FIG. 2A injector configuration). Both spray patterns were used in the tests on the 17,500 lb/hr steam boiler, as will be explained below. It will be understood, however, that the outlet 25 indicated in FIG. 2C is merely illustrative, and not required, as the outlet 26, 211 arrangements also can be used in either of the injector configurations shown in FIGS. 2A or 2E.

For the tests in this boiler, the outlet configuration 211 of FIG. 2B was provided by using Spraying Systems Company's model setup No. SU22, and the outlet pattern 25 of FIG. 2C was provided by using Spraying Systems Company's model setup No. SU29. These setups were each connected to the model ¼JBC injector body, which consists of a rear air inlet for pipe 22 and aqueous solution inlet for pipe 23 with a ¼ inch NPT pipe thread. The model SU22 setup produces a narrow angle spray through one exit orifice, while the second setup model SU29 produces a wider angle spray through six exit orifices. Specifically, according to the Spraying Systems Company, in laboratory tests injecting into ambient air conditions, nozzle setup model SU22 produces a 9 inch wide spray pattern 24 inches from the outlet orifice, with 40 psig air and 30 psig water, model SU29 yields a 13 inch wide spray at only 15 inches from the outlet, at 42 psig air and 20 psig water. In both cases, the spray pattern widened at a very small angle, reaching a maximum penetration of 20 to 30 feet in ambient air. The mean water droplet diameter for the model SU29 nozzle was 30 microns at 46 psig air and 30 psig water, and it increases linearly on semilog plot to 70 microns as the air pressure is lowered to 20 microns. At higher air and water pressures, the droplet size decreases. For example, at 85 psig air and 60 psig water, it is only 19 microns. The model SU29 nozzle setup was used almost exclusively in the dozens of tests in this small boiler as it produced higher $NO_x$ reduction which indicated better mixing with the combustion gases.

The injectors 5, 7 and 10 were inserted through view ports in the rear wall of the boiler 1, as indicated in FIG. 1A, so that the spray was directed toward the combustion gas entering the front wall of the boiler from the outlet of the air cooled slagging combustor 2. The boiler depth was about 10 ft, its width is 5.8 feet, and its height is 7.8 ft. The injector spray heads 5, 7 and 10 were placed at distances ranging from about 3 ft to about 9 ft from the inside rear boiler wall. Results will be discussed below.

Another transverse spray pattern was used in tests on a 100 Mw, coal fired utility boiler. In this case, the water droplet laden air was discharged through a narrow slit 26 cutting the entire hemispherical dome of the water-air mixing chamber, as seen in FIG. 2D. This produces a flat, fan like spray pattern covering almost 180°. The nozzles used were Spraying Systems Co. model no. SU85 placed in a model ½JBC injector body having ½ inch NPT pipe thread rear inlets for the water and air flows. Another nozzle setup, model SU89, has the same water injector, but replaced the wide angle flat spray outlet orifice, with the same six hole circumferential design as in the smaller model SU29 nozzle as shown in FIG. 2C. Here the spray pattern is sharply different for the two injectors. At 44 psig air and 35 psig water pressures in both nozzles, the spray pattern for the round pattern model SU89 nozzle is a cone that is 29 inches in diameter at 27 inches from the nozzle exit, while for the presently preferred model SU85 nozzle it is 85 inches wide. The length of the spray with model SU89 in ambient air tests by Spraying Systems Co. was 13 to 20 feet, increasing with air and water pressure. Therefore, to practice this invention in a large utility boilers, the latter nozzle is preferred because the flat nozzle spray is injected in a plane perpendicular to the combustion gas flow direction, and intercepts the widest possible gas flow. Droplet size tests by Spraying Systems Co. under ambient air conditions for the model SU89 showed mean droplet size increasing from 120 microns at 40 psig air and 30 psig water, to 500 microns at 30 psig air and 30 psig water. As per the following discussion in connection with Table 1, this mean droplet size is appropriate for large utility boilers.

Spraying Systems Co. has also measured the accumulated volume percentage for these droplets. For example, Spraying Systems Co.'s nozzle model SU82, which has the same water flow design as the model SU85 but uses a single outlet for the entrained droplets, 50% of the accumulated volume above the mean size diameter had diameters which increased from the mean diameter to a maximum of only 145% greater. The droplets below the mean size decreased much more sharply, decreasing to one third of the mean size. Furthermore only 10% of the volume was between 33% and 58% of the mean size. These droplet characteristics are of major importance in practicing this invention. Since it is essential to prevent ammonia slip into the stack exhaust, none of the droplets can be injected in a region where the temperature is too low for reaction with $NO_x$.

Field tests by the inventor have showed somewhat higher, about 20%), water flow rates than the published values by Spraying Systems Co. for specific air and water pressures. Consequently, the droplet diameters must be measured for each specific applications by commercial instruments designed for this purpose. The droplet sizes are measurable by the method such as described in U.S. Pat. No. 4,719,092 to Bowers, which teachings are incorporated herein by reference. Alternatively, one can adjust the air and aqueous solution pressures by trial and error to effectively adjust the droplet sizes until maximum $NO_x$ reduction in the boiler has been achieved.

For purposes of this invention, from the volumetric air flow and air pressure at the mixing chamber outlet of the atomizing injector, the initial velocity and momentum of the water droplet can be computed, with the mean particle diameter obtained by measurement or from the nozzle manufacturer's data. Using the aerodynamic drag for the particle, the initial force on the particle is computed. From Newton's Second Law of Motion, one can approximately obtain the time required for the particle to lose a fraction of its initial momentum, for example 10%, while ignoring mass loss due to vaporization. With the model SU85 nozzle at 40 psig air pressure and 30 psig water pressure, 3 gallons per minute water flow were obtained at 17 acfm air flow, where "acfm" is the air flow in cubic feet per minute (cfm) at the actual (a) air temperature and pressure. This yields an estimated outlet velocity for the air and water droplets of 176 ft/sec. This condition was used by the inventor in boiler tests with the SU85 model nozzle and it is almost twice the value given for these pressures in the Spraying Systems Co. product catalog. Table 1 shows the computed time for boiling (i.e. vaporization) of water droplets ranging from 10 microns to 1,000 microns; the time for these droplets to lose 10% of their injection momentum in the hot combustion zone, without consideration of mass loss due to boiling; the distance the particle will travel in the hot gas while losing 10% momentum; and the ratio of 10% momentum loss time over boiling time.

Table 1 shows several key results needed to practice this invention.

1) Particles under 100 microns are unsuitable for large utility boiler because they penetrate less than 2 feet, while losing much of their liquid mass to vaporization. When including the mass loss due to vaporization the depth of penetration will be even less. Since a typical 100 MW boiler is 20 to 40 feet wide, depending on design, numerous injectors would be required and the injector heads would have to be placed deep inside the furnace chamber if less than 100 micron droplets are used.

2) Particles in the size range of about 400 microns to under 1000 microns are suitable for large boilers. In this size range, depth of penetration is many feet with moderate mass loss due to boiling. Note that the large mass loss at 1,000 microns is due to the dominant contribution of the radiative heat transfer term. However, due to the transparency of water to radiation, this effect is most probably overestimated.

A more rigorous analysis of the water droplet behavior can be made, which would include the mass loss due to boiling. However, since the droplet mean diameter can be readily changed by changing air and water delivery pressure, the optimum droplet size can be best determined by testing in the boiler of interest. This is less costly and simpler than using the Franhofer diffraction laser system to determine droplet sizes.

Note that depth of penetration is more important in large utility boilers because the nozzles can economically be inserted only in existing openings in the boiler wall. This means that the droplet spray patterns must be transverse to the gas flow direction, and it is the reason why a fan spray pattern is disclosed as the most effective means of intercepting as much of the gas flow as possible. Alternatively, it is possible use the wide angle spray pattern of the model SU29 nozzle, except in a larger size, and insert the injector from the boiler side walls with the nozzle pointing into the direction of the gas flow, as was done in the 17,500 lb/hr small boiler. However, this would require insertion of numerous injectors deep into the boiler with consequent much increased risk of local overheating of the air and water feed pipes, and blockage of the nozzle outlets by the fly ash in the combustion gases. Consequently, the preferred practice of this invention in large boilers is to insert several fan spray injectors transverse to the gas flow direction, with a number sufficient to cover the proper temperature zone cross-section for urea-$NO_x$ reaction, and with a particle size in the many 100's of microns to assure wide distribution of the urea agent in the gas stream.

Table 1 also indicates that the water droplet size range of 10 to 10,000 microns disclosed in U.S. Pat. No. 4,719,092, among others, is much too wide to teach proper injection in boilers. The lower size is too small to penetrate much beyond the injector, while the upper size is much too large for even very large utility boilers. In Table 1, the following headings are used: the water droplet boiling time (T boil), the time for particle loss of 10% of injection momentum (T mom), the droplet penetration distance for this 10% momentum loss, as applied to various indicated sizes of water droplets. Also shown is the relative time for 10% momentum loss to total boiling time of the particle (Tmom/Tboil).

TABLE 1

| Particle Dia., (microns) | T boil, (sec) | T mom, 10% loss (sec) | Distance for 10% mom loss (ft) | (Tmom)/Tboil), (%) |
| --- | --- | --- | --- | --- |
| 10 | 2.94 E-4 | 2.41 E-4 | 4.24 E-20 | 82 |
| 50 | 7.20 E-3 | 3.02 E-3 | 5.32 E-1 | 42 |
| 100 | 2.85 E-2 | 1.27 E-2 | 2.24 | 45 |
| 400 | 4.00 E-2 | 8.50 E-3 | 1.5 | 21 |
| 1000 | 9.20 E-2 | 6.03 E-2 | 10.6 | 66 |

Table 1 also shows how to practice this invention in different size boilers. In small industrial boilers, injectors 5, 7 and 10 should be inserted in the rear of the boiler 1, as indicated in FIGS. 1A–B, with the droplet spray 6 directed into the combustion gas exhaust in zone 3. In this case, small droplets are not a significant detriment because the entire spray can readily intercept a significant portion of the hot gas flow.

On the other hand, in large industrial and utility, where access ports into the boiler are limited and the volume of gas that must be treated is large, a wide, flat, fan spray pattern 39 indicated in FIGS. 3A–B made using the injector head having the flat spray outlet 26 shown in FIG. 2D, combined with larger droplets is very much preferred. One factor must be considered when injecting droplets in a fan pattern transverse to the gas flow, namely, the gas flow will drive the droplets into the direction of the gas flow. Since the combustion gas velocity in the boiler is substantially lower than the droplet inlet velocity, a slight orientation of the injector into the direction of the gas flow will partly compensate for this effect.

As noted above, the combustion gas temperature within several feet of the inner furnace wall of the boiler is colder than in the central core. Therefore, to practice the present invention, it is necessary to insert the injector nozzle into a zone of gas temperature of 1700° F. to 2000° F., preferably 1800° F. to 2000° F. This zone is shown as region 3 in FIGS. 1A–B, for the small 17,500 lb/hr boiler. For large utility boilers there are several regions that may have this temperature range, depending on the boiler design and operating conditions. These regions are shown as 36 in FIGS. 3A–B for the 100 MW boiler tested by the inventor. In some large boilers, region 311 may be preferable, if the temperature is in the preferred range. The use of the Spraying Systems Co.'s injector model nos. ¼JBC or ½JBC injector assembly requires the attachment of either a ¼ inch or ½ inch pipe for each of the aqueous solution pipe 23 and the air pipe 22 of this injector assembly 21, as shown in FIGS. 2A and 2E. These two parallel pipes 22, 23 are inserted at over several feet into the boiler furnace gas stream into region 3 in FIG. 1A, or region 36 or 311, as indicated below, in FIGS. 3A–B. It is essential to maintain the water temperature in the pipe below the boiling point of about 250° F. (121° C.) at 30 psig. While the compressed air temperature can be higher, it cannot be so high that the droplets will boil in the injector atomization chamber 210. In reducing this invention to practice this occurred in the 17,500 lb/hr steam boiler when the air pipe was inserted over 6 feet into the boiler without additional cooling of the air pipe. For insertion of the injector assembly into a large boiler perpendicular to the hot gas flow, the heat transfer to the outside of these pipes is computed from heat transfer analysis of gas flow normal to a cylinder, as given by McAdams (referenced above). For the present conditions, the external film coefficient is in the range of 15 to 25 Btu/(hr-ft$^2$-° F.). The pressurized water cooled pipe will remain well below the boiling point for flow rates in the several gallons per minute range. Nor will there be internal surface film boiling due to the high nominal 1,000 Btu/(hr-ft$^2$-° F.) heat transfer film coefficient of water. On the other hand, the internal film coefficient for compressed air is only about twice as high as the external film coefficient. Consequently, the compressed air in the pipe will be heated to a temperature well above the boiling point of the water, and steam will form in the air-droplet mixing chamber 210. This was observed in tests in which the injector was inserted more than 6 feet into the 17,500 lb/hr boiler. The water flow stopped periodically every few seconds as the water boiled in the mixing chamber, preventing the outflow of the air laden droplets.

The present invention discloses two methods of preventing boiling, i.e., premature vaporization of the aqueous solution feed, within the injector air-water atomization chamber assembly 210. One method which has been reduced to practice in the ½ inch pipes used for the 100 MW boiler is to place a silicon carbide cement element 27, which has a fairly high thermal conductivity of 50 Btu/hr-ft-° F., in the gap between the aqueous solution pipe 23 and the air pipe 22, as shown in FIG. 2A. Also shown in FIG. 2A, welding small metal studs 28 on the outside of the liquid content pipe 23 on the side facing air pipe 22, and on the air pipe 22 on the side facing the liquid content pipe 23 provide additional anchoring of the cement 27. In addition a low thermal conductivity refractory cement 29, such as alumina, is placed around the remainder of air pipe 22, and this cement 29 is also anchored by metal studs 28 as shown in FIG. 2A, to reduce the heating of the compressed air. This design was tested in a 100 MW boiler and the injector assembly chamber 210 showed no visible signs of deterioration, and injection was maintained at a steady 3 gallons per minute of water flow and 40 psig air pressure. In tests in the 100 MW boiler, due to incomplete thermal insulation of the air pipe, the stainless steel air pipe was heated to over 1000° F. (538° C.), and its differential expansion of almost 1 inch over the 7 feet insertion length into the 100 MW boiler bent the air and water pipes, the latter due to the transfer of force from the air pipe through the metal studs 28 and anchoring silicon carbide ceramic 27 shown in FIG. 2A. This arrangement encountered some loss of ceramic material 27 located between the two pipes during usage. Nevertheless, the injector assembly 21 was still usable for droplet injection and a half dozen short duration tests were performed with this assembly without failure in the 100 MW boiler.

In FIGS. 3A–B, the boiler 31 has a furnace wall 313, coal burners 32, a primary flame zone 33, convective tube banks 35, a zone 36 where the effluent gas temperature is between 1700 to 2000° F., and a hot gas zone 311 between the two convective tube sections 35. Feature 39 indicates the droplet spray pattern provided by the various injector arrangements used in utility boiler 31 as discussed below. In one set of tests, the injector assembly 310 was inserted with the air and water pipes in the horizontal position, as indicated in FIGS. 3A–B, with the water pipe facing upstream and the air pipe placed in the wake of the water pipe. The atomizer exit slit was oriented in the vertical direction so that the water droplets were dispersed in a vertical direction, perpendicular to the gas flow direction. The injectors 310 were inserted on both sides of the utility boiler 31 in front of the slag screen 34 as shown in FIG. 3A. Results will be presented below.

Injection into utility boilers can also be in the narrow space between rows of convective tube sections 35, with injectors 38 shown in FIGS. 3A–B also inserted to produce a vertical narrow fan like spray from a slit spray outlet 26 of an injector head as shown in FIG. 2D. Due to the narrow space in this region small droplets are required to prevent liquid droplet impingement on downstream convective tubes. In the 100 MW boiler used to reduce this invention to practice it was found that the temperature in this zone region 311 in FIGS. 3A–B, was too low, about 1400° F., to yield any $NO_x$ reduction. However, in a 37 MW boiler the temperature in region 311 in FIGS. 3A–B was in the proper temperature range of 1700–2000° F.

Another suitable region for injection in large boilers is the top section of the radiant furnace of the boiler region 36 in FIGS. 3A–B. Two injectors 37 were inserted on opposite sides of the boiler with the flat spray arrangement 26 of FIG. 2D, horizontal and transverse to the upward gas flow direction. Additional injectors 312 can be placed at additional openings on the boiler wall in region of the appropriate gas temperature region 36 in FIGS. 3A–B to provide spray coverage in the entire plane of appropriate gas temperature. It was observed that more than 2 injectors are needed to cover this region 36 in a large boiler. Further results will be discussed below.

A preferred, but more costly, solution being disclosed herein, and illustrated in FIG. 2E, is to design a concentric feed pipe with the compressed water 23 on the outside and the compressed air 22 on the inside with the two pipes feeding to a common spray assembly chamber 210. This second method requires design of an adapter between the two pipes and the ½JBC injector assembly, which is readily implemented by practitioners of mechanical design.

For the ¼ inch injectors used in the small boiler, there was enough flexibility in the ¼ inch water and air pipes that clamping them together provided adequate heat transfer between the water and the air pipe to keep the air pipe cool. This clamping method was used on the 17,500 lb/hr boiler with insertion of the probe to a distance of 9 feet into the boiler with a steady water and air flow.

Another aspect of this invention is a simple means of feeding the urea to the injector system. Referring to FIG. 4, the urea can be delivered in powder form to a utility boiler by tanker truck or railcar, element 41 in FIG. 4, both with bottom discharges 42. The urea drops either through a calibrated rotary valve or screw feeder 423, into an eductor 44 at a rate equal to the quantity of urea required to achieve a specified reduction of NO. One mol of urea reduces theoretically two moles of NO. A high pressure blower 43 conveys the urea powder at several 1000 feet per minute through a feed pipe 47 into a small mixing tank 45, where the urea is mixed with water 46 to reach between several percent to about 20% of urea in the water. A vent and baghouse 48 removes the conveying air. A sump pump, 49 transfers the liquid to another open tank 410. From this tank 410, a sump pump 412 feeds a multi stage pressure booster pump 413, such as Grainger Co. Stock No. 2P372, which was used to reduce this invention to practice. The liquid is pumped at a pressure, measured by pressure gauge 415, designed to produce the proper droplet size in the air atomized injector 418. Compressed air is fed through the air pipe 420 to the injector 418. Pressure gauges 415 and 421 for water and air, respectively, and flow meters 416 for water, and 422 for air, with valves 414 for water and 424 for air, are used to adjust the proper flows and pressures. These valves and meters can be readily automated to adjust the flow rates and pressure as $NO_x$ reduction rates are changed. The injector 418 is inserted through a furnace wall of a boiler into the combustion gas zone of the boiler, as described above and as described in the tests that reduced this invention to practice.

A final item necessary to practice this invention is to measure the gas temperature at which the urea injector is to be placed. Since the desired temperature is preferably between about 1800° F. and 2000° F., a fiberglass insulated Type K thermocouple can be used. The most accurate method to measure the temperature is to place the bare thermocouple tip inside a ceramic tube with the tip within about 1 inch from the end. A 1 foot long tube was found adequate for this purpose. The ceramic tube was inserted into a long stainless steel pipe that was inserted into the boiler. For insertion for more than 1 minute, a water cooled jacket was placed around the pipe. For shorter insertion periods, the steel pipe can be inserted uncooled into the furnace. Measurements with the protruding thermocouple tip and the recessed thermocouple tip in a ceramic tube with gas suction in the latter case, yielded almost identical gas temperatures in the small 17,500 lb/hr steam boiler for values between 1200° F. and 1900° F. Temperature measurements with a K Type thermocouple in the 100 MW boiler will be discussed below.

As noted, this invention was practiced in two different boilers. Several dozen tests of up to several hours duration were performed in a 17,500 lb/hr saturated steam, Keeler Company D frame boiler, which is a boiler of the boiler 1 type shown in FIGS. 1A–B. This boiler has a furnace box 10 feet long by 7.3 feet high by 5.8 feet wide. This boiler was designed for firing oil or gas, and the entire oil/gas burner assembly and windbox were removed and replaced with an air cooled, cyclone coal combustor, modified from the design in U.S. Pat. No. 4,624,191, primarily by increasing its length and air cooling design as follows: The 24 inch long, 17 inch internal diameter, refractory lined, air cooled exit nozzle was attached to a steel box that was welded to the front face of the boiler, at the prior location of the oil/gas burner windbox. This box has an internally refractory lined chamber 22 inches long, 53 inches wide, and 32 inches high into which the combustion gases exhaust from the exit nozzle. Surrounding the exit nozzle were 38 one inch pipes that cooled the exit nozzle walls and provided additional combustion air of temperature below 1000° F. This cooling air was used either for final combustion when the stoichiometry in the coal fired combustor was fuel rich, or for tempering the combustion gas exhaust when the combustor operated fuel lean. In all cases, the combustion gas in the boiler had excess air ranging from 25% to 95% greater than stoichiometric air fuel ratio. Three dimensional computer modeling of the gas temperature distribution in the boiler furnace box showed that the combustion gas exhaust consisted of a narrow hot zone that extended into the furnace section of the boiler for distances ranging from several feet to the far furnace wall. Surrounding this hot core were regions of progressively cooler combustion gases. Since the boiler operated at low steam pressure, about 0 to 25 psig, the water tubes surrounding this chamber were in the range of 212° F.–250° F. Computer modeling for two cases with final 30% excess air in the furnace, showed the central core, whose diameter was about the same as the refractory lined combustor exhaust chamber with a computed gas temperature ranging from 2600° F. at the chamber outlet, i.e. the furnace inner front face, decreasing to about 1900° F. halfway into the chamber for excess air of 10% in the combustor. For fuel rich 80% stoichiometry in the combustor, this hot zone extended to the far wall of the furnace chamber. Surrounding this central core was a cooler zone of about 1500° F., which in turn was surrounded by a cooler zone of about 1200° F. reaching almost to the furnace wall. Therefore in this boiler, urea injection in the relatively small, several feet diameter, central hot core is the only region were effective $NO_x$ reduction could take place. This was indeed confirmed by tests.

Several initial tests were conducted with commercial cleaning ammonia solutions in which ammonia hydroxide, dissolved in water in concentrations of about 4%. It was injected through the rear wall of the boiler into the direction of the central hot gas zone with the ¼JBC-SU29 model injector, which produces droplets under 100 microns. The mol ratio of $NH_3$/NO varied from 0.85 to 1.3, and both fuel rich (stoichiometric ratio of 88%) and fuel lean (stoichiometric ratio of 114%) conditions in the combustor were used. Final stoichiometric ratio in the boiler furnace section was 53% excess air, and 80% excess air respectively. Without the ammonia injection, the $NO_x$ at the stack was ranged from 1.25 lb/MMBtu at excess air in the combustor, to as low as 0.61 lb/MMBtu with fuel rich conditions in the combustor. Note these values of $NO_x$ are reported as $NO_2$, as is standard in the field, although over 95% of the $NO_x$ is emitted as NO from the stack. The reason for this is that NO converts eventually to $NO_2$ in the atmosphere. With the ammonia injection, the $NO_x$ emission at the stack was reduced by 50% to 60%. This indicates about 50% utilization of the ammonia, which is excellent considering that due to the high excess air, the hot gas region of favorable temperature for $NH_3$—NO reaction is very small, being at most several feet in diameter. Tests were shifted to urea injection due to the hazardous nature of utilizing ammonia even at these low concentrations.

Example 2

Representative test results with urea injection conducted in a small boiler are provided below. In general, the preferred quantity of urea injected was at a rate approximately equal to the NO rate produced in the absence of the urea. Since the combustor was operated under both fuel rich and fuel lean conditions, the $NO_x$ level without urea injection was substantially lower in the first case due to the $NO_x$ reduction effect of staged combustion.

In runs 2 and 3 with urea injection in the 17,500 lb/hr package boiler fired with an air cooled slagging combustor, the magnitude of ammonia "slip" in the stack gas was measured with urea injection. The results are shown in Table 2.

TABLE 2

| Run | SR1/SR2 | $NO_2$, (lb/MMBtu) | NO, (mol/h) | Urea, (mol/h) | CO in stack from urea, % | $NH_3$, (ppm) | % $NO_x$ Reduction | Urea Utilization, % |
|---|---|---|---|---|---|---|---|---|
| 1 | 1.31/1.95 | 0.9 | 0.29 | 0 | 0 | 0 | 0 | — |
| 2 | 1.31/1.95 | 0.37 | 0.12 | 0.176 | 19 | 5.4 | 59 | 48 |
| 3 | 1.31/1.95 | 0.54 | 0.17 | 0.121 | 11 | 6.2 | 40 | 50 |

These tests were performed under high excess air in the combustor, namely, a Stoichiometric Ratio, SR1, of 1.31, (i.e. 31% excess air), and SR2 in the furnace of 1.95. Here the gas temperature in the furnace section of the boiler was well below the temperature needed for optimum $NO_x$ reduction, i.e. 1700–2000° F., except in the central core outlet of the combustor flame. The SU29 water atomized injector 5 in FIG. 1, with exhaust ports 25 in FIG. 2C, was directed toward this hot flame zone 3, having a temperature of 1800° to 2000° F., from the center rear of the boiler. Two moles of NO are required for each mole of urea, $NH_2C(O)NH_2$. In these tests, the urea utilization was about 50% in both injection cases representing the present invention, i.e., runs 2 and 3. This is anticipated in view of the minimal region of appropriate temperature for urea-NO reactions. However, the ammonia slip measured for runs 2 and 3 was well below the 10 ppm at which ammonia sulfate/sulfite compound form air heater deposits in utility boilers and plumes out of the stack. The first $NH_3$ sample was taken at outlet of the induced draft fan, downstream of the baghouse, where the gas temperature was about 250° F. The second $NH_3$ measurement was taken at the outlet of the boiler where the gas temperature was between 450° F. and 500° F. This was done to assure that $NH_3$ slip was not being masked by absorption by water droplets which were injected upstream of the baghouse and downstream of the boiler outlet to cool the stack gases. Another important result is that only 19% and 11%, respectively of the CO, a toxic pollutant, in the urea remained in the stack (See Column 6 of Table 2). In other words, the other 80+% was converted to $CO_2$. This result was determined from the increase in CO concentration from 101 ppm to 154 ppm in the first urea injection test, and from 103 ppm to 124 ppm in the second urea injection test. Both the CO and $NH_3$ stack results show that with proper injection into the hot gas zone, both these pollutants can be minimized. This result is especially important in practicing this invention as the proper temperature zone in this small boiler is very limited.

Example 3

Additional tests were performed to determine the best means of injecting the urea-water droplets in a small boiler. Table 3 compares the results of a test on the 17,500 lb/hr boiler in which the model SU29 injector was inserted into the rear of the boiler at two locations. The first location was the same as described for injector 5 in the case shown in Table 2, namely, through the boiler viewport in the center of the rear wall of the boiler 1 in FIG. 1B. The combustor and furnace stoichiometry and coal feed rates were almost identical to those shown in Table 2. This injector 5 was inserted about 3 feet into the furnace as in the Table 2 test with the same urea injection rate. Table 3 shows a $NO_x$ reduction was also about the same, 63% versus 59% previously. The urea utilization was also about the same 50%. A second injector 7 was inserted into the boiler 1 to about the same depth. It was inserted through a viewport at the same elevation as the first injector. This port was about 6 inches from the inner wall opposite the convective section of the boiler. The injector was attached to 26 inch long air and water pipes that were attached at 45° angles to the pipes that were inserted through the boiler wall. The latter were inserted about 3 to 4 feet into the furnace. Consequently, this second injector, also a model SU29 unit, produced a water spray that was outside the hot central core appropriate for $NO_x$ reduction. The results of the study of the effect of multiple injectors in a urea injection test in the 17,500 lb/hr package boiler and combustor described above are summarized in Table 3 below.

TABLE 3

| Run | SR1/SR2 | No. of Injectors | $NO_2$, (lb/MMBtu) | NO, (mol/h) | Urea, (mol/h) | % Urea Utilization | % $NO_x$ Reduction |
|---|---|---|---|---|---|---|---|
| 4 | 1.22/1.81 | 0 | 0.83 | 0.278 | 0 | — | 0 |
| 5 | 1.22/1.81 | 1 | 0.30 | 0.10 | 0.178 | 50 | 63 |
| 6 | 1.22/1.81 | 2, each 50% urea | 0.47 | 0.158 | 0.178 | 33 | 43 |

Since the droplets from these injectors were under 100 microns, the analysis from Table 1 indicates that most of the droplets vaporized within 1 feet from the injector and outside the hot zone. Also the direction of the droplets was at an angle of approximately 45° to the hot central core emerging from the combustor exhaust. In this dual injector tests, the water mass flow rate for the two injectors was equal to that of the prior single injector. Nevertheless in this case, the $NO_x$ reduction was only 43%, one third less than in the single injector case, and the urea utilization was one third less. This result is very important to the practice of this invention in that it shows that injection of aqueous urea droplets outside the proper temperature zone is inefficient even when the injector is very near the hot zone.

Example 4

In addition to the above tests that demonstrate the importance in this invention in placing the aqueous urea injectors directly into the proper temperature zone for the urea-NO reaction to proceed, additional tests were performed in the 17,500 lb/hr boiler. One test, whose results are shown in Table 4, was designed to show that injection of an excess amount of solution has relatively less benefit in reducing $NO_x$ while increasing the risk of increased $NH_3$ and CO pollutants. In this test the same dual injectors as were used in the test shown in Table 3 were used. The difference was that the quantity of solution was varied. Incidentally, note that in all the tests in the 17,500 lb/hr boiler, the concentration by weight of urea and ammonia in water was approximately in the 1 to 4 percent range. Note in all the tests shown in Tables 2, 3 and 4, both the combustor and boiler stoichiometry were fuel lean. Therefore, no benefit from staged combustion accrued in all these tests.

In Table 4 below, results are summarized of additional tests investigating the effect of two injectors and varying urea concentrations using urea injection in a 17,500 lb/hr package boiler and combustor as described above.

3) The CO emissions at the stack resulting from the CO in the urea are somewhat higher than in the tests shown in connection with Table 2. Nevertheless they still show that most of the urea was dissociated and that CO was converted to $CO_2$.

Example 5

The next conducted test was designed to determine the effectiveness of multiple injectors into the proper gas temperature zone. A model SU29 injector as injector 10 (see FIG. 1A) was inserted through a viewport in the rear 17,500 boiler wall that was in the exact center of the wall, in line with the centerline of the combustor. Another model SU29 injector as injector 5 was in the same position as in all other

TABLE 4

| Run | SR1/SR2 | $NO_2$, (lb/MMBtu) | NO, (mol/h) | Urea In/ Urea Out | Urea, (mol/h) | % Urea Utilization | % $NO_x$ Reduction | CO from Urea, (%)) |
|---|---|---|---|---|---|---|---|---|
| 7 | 1.13/1.72 | 0.71 | 0.248 | 0 | 0 | — | 0 | 0 |
| 8 | 1.13/1.72 | 0.32 | 0.11 | 66%/34% | 0.111 | 62 | 55 | 35 |
| 9 | 1.13/1.72 | 0.21 | 0.073 | 55%/45% | 0.317 | 28 | 70 | 23 |
| 10 | 1.13/1.72 | 0.23 | 0.080 | 81%/19% | 0.297 | 28 | 68 | 23 |

Several important points related to this invention can be determined from the results shown in Table 4.

1) By comparing the data for run 8 with runs 9 and 10 in Table 4, injecting urea at a mol rate of greater than the rate of untreated NO, i.e. at greater than twice the stoichiometric ratio, does not lead to improved utilization of the urea. On the contrary, its utilization decreases by over a factor of 2 in this test. Also the data of runs 9 and 10 of Table 4 indicate that for excessive urea injection, the relative distribution of mass flow rate through the preferred inner and non-preferred outer injectors is not as important.

2) The fifth column of data in Table 4 shows the ratio of mass flow of aqueous urea in the inner rear wall injector, which injects directly into the appropriate hot combustion zone, to the outer injector, which is inserted into the rear boiler wall next to the water wall and then slanted at 45° toward the central core. Note that the run 8 data in Table 4 shows that where two-thirds of the urea was injected through the inner injector, with the balance in the outer injector, the $NO_x$ reduction was 55%. This can be compared to the almost identical test conditions, but with equal urea injection in both injectors as shown in run in Table 3, where the reduction was only 43%. This lower $NO_x$ reduction in the run 6 test of Table 3 was despite the 60% higher mass flow rate of urea compared to the test run 8 in Table 4. This is very strong evidence that to practice this invention the urea should be injected directly into the appropriate temperature gas zone 3 as indicated in FIG. 1A.

previous tests with the inner injectors. This latter viewport was 16 inches to the right of the center viewport and inclined at an angle of about 9° toward the center. Therefore, both injectors, when inserted at about 4 feet into the furnace from the rear boiler wall, sprayed into the hot center zone 3 of the combustor exhaust as shown in FIG. 1A. The results of this test are summarized in Table 5 below. Also, to determine the effect of a slight change in the orientation of the injector, single injector tests were conducted with the new centerline injector 10 only. This would determine any changes from the previous single injector tests where the injector that was slightly off center line, i.e. the second injector in the present tests was used. Note in this test the combustor was slightly fuel rich, SR1 of 0.95. Therefore, there was some $NO_x$ reduction from staged combustion, and the $NO_x$ emission was 0.56 lb/MMBtu, compared to 0.71 in Table 4, in the absence of urea injection. The results in Table 5 show the effect of two injectors injecting into the center of the boiler in the combustion gas temperature for effective $NO_x$ reduction in the 17,500 lb/hr package boiler fired with the air cooled slagging combustor as described above.

TABLE 5

| Run | SR1/SR2 | $NO_2$, (lb/MMBtu) | NO, (mol/h) | Urea Old/ Urea New* | Urea, (mol/h) | % Urea Utilization | % $NO_x$ Reduction | CO from Urea, (%)) |
|---|---|---|---|---|---|---|---|---|
| 11 | 0.95/1.51 | 0.56 | 0.19 | 0 | 0 | — | 0 | 0 |
| 12 | 0.95/1.51 | 0.36 | 0.122 | 0%/100% | 0.059 | 58 | 36 | 0 |
| 13 | 0.95/1.51 | 0.24 | 0.088 | 0%/100% | 0.098 | 52 | 57 | 0 |
| 14 | 0.95/1.51 | 0.23 | 0.07 | 0%/100% | 0.197 | 29 | 59 | 7 |
| 15 | 0.95/1.51 | 0.20 | 0.067 | 50%/50% | 0.197 | 27 | 64 | 38 |

*: (Urea Old) applies to the inner injector 5 location in FIG. 1 used in the previous tests. (Urea New) applies to the injector 10 at the exact centerline of the combustor-boiler furnace 1 as shown in FIG. 1.

The results in this test confirmed the previous results. Specifically, injecting urea at a concentration greater than the NO mol flow rate is not effective in producing $NO_x$ reduction commensurate with the increased urea rate. This is seen from the data for runs 14 and 15 of Table 5, where the urea use rate decreases sharply and the CO concentration from the urea increases. The data for runs 14 and 15 of Table 5 also show that two parallel injectors into the hot combustion zone yield no significant improvement over a single injector in this zone. Furthermore, the CO emission is substantially higher with the dual injectors.

There is no significant difference between the single injectors in this test with the single injector used in the test shown in Table 2, although there was no detectable CO from the urea, compared to under 20% in Table 2. As noted, the only difference between the results in Table 5 and Table 2 is that in the former tests the single urea injector faced directly into the centerline of the boiler, while in the latter tests the injector was offset by 9° and 16 inches to the right of the centerline. In both set of tests, the direction of the spray jet was into the hot gas zone.

Example 6

The further test conducted was designed to determine the difference in injecting aqueous urea at various locations in the central combustion gas zone where $NO_x$ reduction was effective by injecting at various distances from the rear furnace wall toward the front wall. Injector 5 in FIG. 1 was inserted at distances of 3 feet, 6 feet and 9 feet from the rear inner furnace wall. At 9 feet, the injector 5 is within 1 foot of the front inner wall of the furnace section of the boiler, were the combustion gases exit the combustor exit nozzle transition section. Table 6 below shows the results of this urea injection test in the 17,500 lb/hr package boiler fired with the air cooled slagging combustor. It shows the effect of one injector placed at various distances along the central axis of the boiler where the combustion gas temperature for effective $NO_x$ reduction is optimum. Also shown is the combined effect of very fuel rich staged combustion and urea injection. In Table 6, "N.A." means "not applicable".

injector showed that at the point of maximum insertion, the injector head had dropped below the combustion gas outlet chamber from the combustor, i.e. below region 3 in FIGS. 1A–B. Therefore, much of the spray was directed toward the front wall of the furnace, outside the hot gas exhaust.

The last two runs 20 and 21 reported in Table 6 show the effect of staged combustion under very fuel rich combustor operation with a stoichiometric ratio, SR1, of 0.69 and 0.71 in the combustor. This has been shown by those well versed in this field to be near the optimum for $NO_x$ reduction in coal firing under staged conditions. However, such fuel rich operation in this combustor is accompanied by substantial unburned solid carbon particles from the coal, in the range of 5% to as much as 20% of the solid carbon. Consequently this approach for $NO_x$ reduction is not desirable by itself. The run 21 in Table 6 shows the effect of urea injection at this condition with the injector 3 feet inside the rear boiler wall in the center of the boiler as in the other tests in Table 6. The result shows very poor urea utilization of only 15%, which is consistent with the other results at which the amount of urea injected exceeded the original NO concentration in the combustion gas flow. On the other hand, since at this fuel rich condition combustion of CO and $H_2$ continues in the furnace, there is little CO left from the urea in the stack. In fact, the total CO was only 82 ppm compared to 59 ppm without the urea. Therefore, this result teaches that there is a benefit to operate under somewhat fuel rich conditions in order to allow conversion of CO to $CO_2$ in the furnace zone.

Example 7

Another parameter studied for practicing this invention related to determining the effectiveness of different injector

TABLE 6

| Run | Distance from Rear Wall, ft | SR1/SR2 | $NO_2$, (lb/MMBtu) | NO, (mol/h) | Urea, (mol/h) | % Urea Utilization | % $NO_x$ Reduction | CO from Urea, (%)) |
|---|---|---|---|---|---|---|---|---|
| 16 | N.A. | 0.94/1.45 | 0.43 | 0.159 | 0 | 0 | 0 | 0 |
| 17 | 3 | 0.94/1.45 | 0.21 | 0.078 | 0.13 | 31 | 51 | 0 |
| 18 | 6 | 0.94/1.45 | 0.21 | 0.078 | 0.13 | 31 | 51 | 0 |
| 19 | 9 | 0.94/1.45 | 0.23 | 0.085 | 0.13 | 28 | 47 | 7 |
| Very Fuel Rich Combustor Operation, with and without urea injection | | | | | | | | |
| 20 | N.A. | 0.71/1.25 | 0.3 | 0.11 | 0 | 0 | 30% vs SR1 = 0.94 | 0 |
| 21 | 3 | 0.69/1.19 | 0.19 | 0.07 | 0.13 | 15 | 56% vs SR1 = 0.94 | 15 |

In the axial injector insertion test at various distances along the furnace axis, staged combustion was used with SR1 equal to 0.94 and SR2 equal to 1.45. Therefore, some of the $NO_x$ reduction is due to the staged combustion effect. There is no significant difference among the $NO_x$ reduction results as the injector is inserted along the entire length of the furnace section of the boiler. This is consistent with the temperature measurements and combustion gas temperature modeling which showed that a central core, somewhat larger than the dimensions of the exhaust gas flow from the combustor-boiler transition section were at about the temperature of about 1900° F. The injector remained inside this hot core as it was inserted into the furnace, and, therefore, no difference in the $NO_x$ reduction was anticipated. In a similar test, when the same injector was inserted along this hot gas zone, the $NO_x$ reduction at the point of maximum insertion of 9 feet was less than 50% of the results at 3 feet and 6 feet insertion. Post test inspection of the location of the nozzle designs on the $NO_x$ reduction. Table 7 below shows the results of a test with an air atomizing nozzle, Spraying Systems Co. product model ¼JBC-SU22. As noted above, this air atomized nozzle has only a single outlet 211 as shown in FIG. 2B, for injecting the atomized water droplets into the combustion gas. In addition, a test was performed with a hydraulic nozzle in which the droplet spray pattern was produced by high pressure water forced out of a small orifice. This spray nozzle was by Spraying Systems Co. model ¼N22. The spray was produced by water pressures in the range of 80 to 100 psig, and the droplets are in the range of 100 microns, which is larger than an air atomized droplet generator at the same pressure. The spray pattern was similar to that produced by the nozzle of FIG. 2A.

According to the manufacturer, Spraying Systems Co., the hydraulic nozzle model ¼N22 produces a relatively wide angle spray of about 74° for the present conditions. However, this inventor's experience is that the spray is very localized with limited penetration, and it yields substantially poorer results compared to air atomized nozzles at equal conditions. Table 7 shows the effect of the different single injectors in the 17,500 lb/hr package boiler fired with the air cooled, slagging combustor as described above.

TABLE 7

| Run | SR1/SR2 | Injector Model Type | $NO_2$, (lb/MMBtu) | NO, (mol/h) | Urea, (mol/h) | % Urea Utilization | % $NO_x$ Reduction |
|---|---|---|---|---|---|---|---|
| 22 | 1.12/1.8 | None | 0.79 | 0.25 | 0 | — | 0 |
| 23 | 1.12/1.8 | SU22 | 0.40 | 0.127 | 0.13 | 49 | 47 |
| 24 | 1.12/1.8 | SU22 | 0.28 | 0.098 | 0.216 | 20 | 65 |
| 25 | 1.11/1.79 | None | 0.7 | 0.172 | 0 | 0 | 0 |
| 26 | 1.11/1.79 | 1/4N22 | 0.36 | 0.115 | 0.216 | 13 | 49 |

The injector model types referred to in Table 7 were obtained from Spraying Systems Co. Table 7 shows that while the hydraulic spray yielded 49% $NO_x$ reduction, the urea utilization was very low. Part of this can be attributed to the observation in the other tests, that the urea mass flow rate should not be greater than the NO flow rate, as was the case here. Even accounting for this still yields a low urea utilization. Part of the reason for this is that the droplets emerging from this atomizer are substantially larger than air atomized droplets at equal conditions. Nevertheless, this test indicates that the hydraulic nozzle inserted into the hot gas stream may be effective is applications where larger droplets and a limited spray distribution with larger droplets are allowable.

Comparing the single outlet air atomizer in this test, as shown in Table 7, which a similar result in the multiple orifice injector model SU29 as shown in Table 2, one notes that for about the same combustion conditions, i.e. excess air in the combustor and boiler and about the same $NO_x$ reduction, 65% here versus 59% there, the urea utilization in the SU22 is substantially lower, 20%, versus 48% in the injector model SU29 case of Table 2. In both cases, the urea mol flow rate is less than the original $NO_x$ mol flow rate, a condition which the other tests showed should yield better urea utilization. It is therefore concluded that this invention for smaller boilers should be practiced with a multiple orifice outlet air atomizer injector. However, there may be furnaces where the single orifice outlet air atomizer may be more advantageous.

Example 8

Another series of tests were performed to determine the impact of injecting the aqueous urea at temperatures higher than the optimum 1800–2000° F. range. For this purpose, run 27 was performed. In run 27, the model SU29 injector 8 was inserted at zone 4 in front of the outlet of combustion gases from the combustor 2 in FIG. 1A, facing in the downstream direction. A thermocouple inserted at that location showed that the gas temperature at that location ranged from 2325 to about 2750° F. The latter value is obtained by linear extrapolation because the upper limit of the K thermocouple is 2500° F. The urea injection rate was the about the same as the NO flow rate. With injection in zone 4, $NO_x$ emissions were reduced by only 15%. Using the same injection rate through the injector 5 in the rear of the boiler of FIGS. 1A–B, inserted about 4 feet into the boiler resulted in 40% $NO_x$ reduction. No reduction would have been anticipated with the first injector because the temperature was substantially over the 2000° F. upper limit for the urea-NO reaction. However, as the droplets were directed downstream, and the temperature decreases rapidly as the gases flow out of combustor exit section in 1 foot from the injector location, which allows some droplets to enter the cooler gas zone 3 in FIGS. 1A–B. This result shows that $NO_x$ reduction is still possible with injection at locations that are hotter than 2000° F., provided droplets are of sufficient size to enter the proper temperature zone prior to complete vaporization. This conclusion was verified in large boiler tests, discussed below.

Example 9

Another issue of importance in practicing this invention is the amount of ammonia from the injected urea or ammonia that reports to the slag. Excessive ammonia, as determined by olfactory odors eliminate the use of fly ash for beneficial purposes. In view of the importance of this issue, a separate series of tests, i.e., runs 28, 29 and 30 were performed in which the urea injection was sustained for a period of about 1½ hours during a 2½ hour coal fired period in the 17,500 lb/hour boiler. The operating conditions on these runs were substantially the same as in the other runs listed in the above Tables 4, 5 and 6. The combustor stoichiometry varied between slightly fuel rich, i.e. SR1 of 0.9 to slight fuel lean, i.e. SR1 of 1.1. In the first two runs 28 and 29, the $NO_x$ level was about 0.7 lb/MMBtu without urea and about 0.4 with urea injected through a single nozzle through the center rear wall of the boiler at a rate averaging 5.76 lb/hr, or 0.096 mols/hour. This was lower than the untreated NO flow rate of 0.135 mols/hour, and as a result the urea utilization was about 50%. The third run 30 was performed at about the same combustion conditions. In addition, urea injection rate varied from 3.4 to 9.4 lb/hr, with an average of about 6.7 lb/hr. At the higher rate, the urea utilization was low because, as found in the other tests, the urea mass flow rate exceeded the original untreated $NO_x$ flow rate. If there was substantial ammonia slip into the stack gases, it should have reported in substantial quantities to the fly ash because in the run 3 reported in Example 2 that was conducted under similar conditions, only 5 to 6 ppm of ammonia was measured in the stack gas exhaust from the boiler. As there was no means available for real time stack fly ash sampling, the ash samples were grab samples taken from the ash collection barrel that collects the ash at the bottom of the stack gas particulate baghouse. In addition, since a water droplet spray is used to cool the combustor exhaust gases from about 450–500° F. to 250–300° F. at the inlet of the baghouse there was concern that some of the ammonia might be captured by this water spray. To test for this possibility, a wet ash sample from the ash deposits that lined the inlet duct to the baghouse was analyzed for ammonia after runs 28 and 30 were conducted. The ammonia content, as analyzed by the SSM Laboratories, Reading, Pa., was less than the detectable analytical limit of 2 milligrams/kg (i.e. 2 parts per million by weight (ppmw) for run 28 and 6.4 mg/kg for run 30. This indicates that no significant ammonia was removed in the inlet duct to the baghouse.

The ammonia content in the fly ash barrel grab sample was 107 mg/kg for run 28. It was 110 mg/kg and 71.9 mg/kg for two grab samples taken from the fly ash barrel on run 30. There was no detectable ammonia odor in all fly ash barrels. For run 29, two grab samples taken from ash collected at different times during the urea injection period had ammonia concentrations of 54.7 mg/kg and 44.8 mg/kg. To relate these values for runs 28 and 29 to the urea injection rate of 5.76 lb/hr, (2.615 kg/hr), of which 1.481 kg/hr was ammonia ($NH_3$), use was made of the observation that approximately one-third of the coal fly ash is carried out of the combustor and boiler to the stack. At the injection rate of 1180 lb/hr of 11% ash coal, the fly ash to the baghouse is 43 lb/hr, (19.5 kg/hr). Analysis of the composition of the fly ash showed that on a dry basis, the run 28 ash sample had 28.4% unburned carbon, 13.8% calcium oxide obtained from injecting limestone with the coal to condition the slag, and a balance of 58.2% coal fly ash. This, therefore, yields a total solid flow rate for the baghouse material of 19.5/0.582 or 33.5 kg/hr, which in turn yields an ammonia rate of 3.58 grams of ammonia per hour. This represents only 0.23% of the ammonia injected from the urea. A similar analysis for run 29 yielded 0.1% of the ammonia injected from the urea in the fly ash. The ammonia deposition rate for run 30 was in the same range as run 28 despite the higher injection rate during part of the former test. It is, therefore, clear that the unused urea does not report to the fly ash, and in view of the fine fly ash particles passing our of the combustor, of size under 10 microns, it is unlikely that the unused ammonia in the urea deposits elsewhere in the boiler tube walls. A reasonable conclusion is that it dissociates into other compounds, such as nitrogen and water.

Summarizing the tests of examples 2–9 performed in practicing this invention in small boilers, such as the present 17,500 lb/hour steam boiler, an air atomized droplet injector must be placed directly into the combustion gas stream that is in the temperature range of 1700° F. to 2000° F., the droplet size should be under 100 microns, the injector should be aimed into direction of the combustion gas outflow from the burner, the depth of penetration of the injector into the hot gas flame is not important provided that the injector is inside the proper gas temperature zone, multiple injector nozzles are not of added benefit unless they are properly spaced inside the appropriate gas temperature zone, and the urea mass flow rate must be less than the original non-urea NO mass flow rate. This invention can also be practiced at less efficiency with a single orifice outlet in the air atomized nozzle or with hydraulic atomized droplet nozzles. The present test effort also shows that the proper design and placement of the droplet injectors is effective without the use of chemical additives to widen the range at which the ammonia or urea reaction with $NO_x$ is effective. The test results also show that excessive injection of urea, above the level of untreated $NO_x$ emissions results in a sharp decrease in the urea utilization.

It is possible that in small boiler two injectors placed at separations from each other in the gas flow direction, as opposed to placement in a single plane perpendicular to the gas flow direction, may improve the urea utilization.

The above discussion shows one knowledgeable in the art how to practice this invention. It also shows that the other prior art cited teaches away from the critical role of the injection method for efficient and effective $NO_x$ reduction with urea or ammonia.

Example 10

In addition to practicing this invention in the small 17,500 lb/hr steam boiler, further tests were also conducted in a 37 MW and a 100 MW utility boiler. The 100 MW face fired boiler had two rows of six pulverized coal burners per row on one side of the 40 foot wide lower end of the radiative furnace section. To reduce $NO_x$ emissions the boiler has been equipped with "low $NO_x$" burners as well as additional air ports above these burners, called "overfire air". These modifications are well known to practitioners of the art. Using these two features in combination, the $NO_x$ emission of this boiler average 0.33 lb/MMBtu, which is more than adequate to meet current U.S. emission standards. The objective of the urea injection tests was to determine if these emissions could be further reduced.

To determine the appropriate urea injection location, unshielded thermocouple measurements were made in which a bare K-type thermocouple tip protruded by about 1 inch beyond a ¼ inch stainless steel pipe into the boiler gas stream. The thermocouple was shielded the balance of its length with fiberglass insulation. It was anticipated that due to radiation from the thermocouple, it would under-report the actual gas temperature by a unknown percentage. However, based on thermocouple readings in the 17,500 lb/hr boiler, it was determined that in the temperature range below 2000° F. there was no significant difference between the readings of this unshielded thermocouple and one whose bare tip was recessed inside a ¼ inch internal diameter alumina ceramic tube which was attached to a water cooled steel pipe and connected to a vacuum pump drawing combustion gases into the alumna tube and over the thermocouple.

The unshielded K thermocouple with protruding bare tip was inserted through an access port on the narrow 24 feet wide furnace wall of the 100 MW boiler at a location about 45 feet above the centerline of the coal burner elevation. This port was about 20 inches upstream of the slag screen located at the inlet to the convective tubes in the boiler. Another temperature reading was obtained through a port located in the same wall, between the first group of convective tubes behind the slag screen and the second group of convective tubes. The spacing between these groups of tubes was a little over 2 feet.

With the 100 MW coal fired boiler firing at full load, the K type thermocouple temperature measurements made as a function of distance from the boiler wall are shown in Table 8. A substantial temperature gradient was noted in the first 6 feet from the boiler wall. Also, the second location, directly behind the slag screen convective tube section was substantially below the 1700–2000° F. range for effective urea-NO reaction, while the first location was in the proper temperature range beyond 6 feet from the furnace wall.

TABLE 8

| Distance from furnace wall, ft | 3 | 6 | 9 | 12 |
|---|---|---|---|---|
| Before slag screen, ° F. | 1540 | 1683 | 1728 | 1810 |
| After slag screen, ° F. | 1116 | 1203 | 1225 | 1245 |

Before the analytical modeling of the combustion gas temperature distribution in the 17,500 lb/hr boiler was complete, the narrowness of the high temperature zone in the combustion gas emerging from the combustor was not recognized. Many of the temperature readings obtained with the same thermocouple were in the same range as the readings in the 100 MW boiler after the slag screen. The fact that excellent $NO_x$ reduction was obtained in the 17,500 lb/hr boiler was erroneously attributed to low temperature readings caused by radiation losses from the thermocouple. Consequently, the first urea injection test was performed in this second region 311 located behind the slag screen 34, as shown in FIG. 3A, using two injectors 38. These two model SU85 an air atomized injector assembly 210 in FIG. 2A having a narrow exit slit 26 in FIG. 2D cutting the entire hemispherical dome of the liquid-air atomizing chamber, which produce a fan like flat spray of large droplets, were inserted at these ports on opposite sides of the boiler wall to a distance where the injector tip was about 6 feet from the inner furnace wall. The plane of the droplet spray fan was oriented perpendicular to the gas flow direction. The injector assembly, designed as described above, was oriented with the water pipe facing in the upstream gas direction. The water flow rate for each injector was 3 gallons/minute at about 30 psig, and the air atomizing pressure was about 40 psig. The urea concentration in the water was about 14%, which was substantially higher than the 1 to 4% range used in the small boiler. No change in the 0.33 lb/MMBtu/hr $NO_x$ emission level at the stack of the boiler was noted. This confirmed that the temperature reading was indeed correct, as was also subsequently confirmed for the small boiler, and therefore, the temperature was too low for the urea-$NO_x$ reaction.

The droplet injector 310 was then inserted upstream of the slag screen as indicated in FIG. 3A, where the prior temperature measurement indicated that this was the appropriate temperature location. Only one injector was inserted a distance of 6 feet into the furnace, and within several minutes, the $NO_x$ level at the stack decreased from 0.33 to 0.24 lb/MMBtu. The spray orientation was vertical. The first number corresponds to 363 lb/hr of $NO_2$, while the second number is 264 lb/hr of $NO_2$. This converts to NO mol flow rates per hour of 7.89 and 5.74, respectively. The urea injection rate was 3.5 mols/hr. This resulted in a NO reduction of 2.15 mols/hour, which corresponds to an urea utilization rate of only 31%. However, with only one injector, the interception of the gas flow by the spray fan was less than one-half of the cross-sectional area of the gas flow in the proper temperature range. Therefore, to practice this invention additional injectors must be placed so as to intercept the entire appropriate gas flow. Also, based on the results in the small boiler, the urea injection rate should be less than the initial NO flow rate in the boiler.

The above test of this example was repeated at a later date with two injectors 310 (FIG. 3A). Two model SU-85 injectors 310 with a vertical fan droplet spray were inserted in front of the slag screen 34. This time the initial $NO_x$ emission was 0.43 lb/MMBtu and the $NO_x$ reduction was only 24%. The urea utilization was only 20%. Uncooled thermocouple measurements showed temperatures of 1670 to 1760° F. at this location 6 to 9 feet from the wall, which was at the lower end of the appropriate temperature range. Ammonia slip at the stack was high, viz., 45 ppm at 3% $O_2$.

Two injectors 37 were then placed at a lower level in the boiler with the flat horizontal spray pattern as indicated in FIG. 3A and FIG. 3B. The thermocouple measurement at this location was 1620 to 1670° F., again at the lower end of the appropriate range for $NO_x$ reduction. The $NO_x$ reduction was now only 6% at the same urea injection rate as in front of the slag screen. Ammonia slip was lower, 18.7 ppm at 3% $O_2$. These two results show that the spray pattern intersected only a small fraction of the gas flow. As a result excessive urea was injected at that spray location which yielded the high ammonia slip.

While Spraying Systems Company provides specifications on the droplet spray pattern, cold flow tests performed by the inventor showed that the model SU85 spray nozzle produced a fan patterns that was about 6 feet wide at about 6 to 8 feet from the injector outlet. Also the spray was very susceptible to cross winds, as noted above, and extended less than one half of the 19 feet from the injector outlet of the Company's specifications.

Furthermore, the combustion gas flow, the combustion gas temperature, and the ash deposits on the boiler wall and slag screen change as the boiler load is varied, as the type of coal is varied, and as the ash deposits change, especially between soot blowing periods. Visual observation of the slag screen on the 100 MW boiler showed that on one side the ash coverage in the slag screen was heavier on one side of the boiler. This affects the gas flow and temperature distribution.

As a result of the observations reported in the previous two paragraphs, the preferred means of practicing this invention is thought to be to place a group of injectors at several locations inside the appropriate furnace section, so that the fan type spray patterns 39 cover the entire hot cross-sectional area 36 of the effluent gas flow at 1700–2000° F., as shown in FIG. 3B. Furthermore, a feedback control from a set thermocouples that are periodically inserted at various locations in or near the appropriate temperature zone should be used to determine the proper number of droplet injectors to insert into the boiler. This procedure can be rapidly implemented with the injection system disclosed by this invention. Due to the low cost and simplicity of this injection equipment, this determination can be accomplished at low cost in the trials on the boiler.

The small reduction achieved was almost certainly due to the use of only 2 injectors, especially at location 37 in FIG. 3A and FIG. 3B, where two injectors intercepted a much smaller fraction of the gas flow than in front of the slag screen location 310 (FIG. 3A and FIG. 3B). Based on the results measured, 4 to 6 injectors should yield well over 50% reductions. This is substantially less than the number of wall injectors reported in a prior art.

Another key result of the 100 MW boiler $NO_x$ control tests shows that placement of the injectors in a region of low temperature, in this case in between the convective tube banks, resulted in no $NO_x$ reduction. In view of the fact that the temperature of the gas near the boiler wall is lower than in the central core with consequent loss of chemical agent, namely urea or ammonia that reacts with $NO_x$, the teaching of prior art that design and placement of the injectors of the chemical agent that reacts with $NO_x$ can be placed at the furnace wall will result in ineffective $NO_x$ reduction.

A second set of tests was also performed in a smaller utility boiler rated at 37 MW, whose cross-sectional area at the superheater elevation was about 22 by 22 ft. Initially, one of the model SU85 flat spray injectors was inserted about 5 feet into the middle, side wall of the boiler at the superheater elevation. The spray pattern was horizontal in order to intercept the upward flowing hot combustion gas. The thermocouple temperature was measured at 1750° F. This boiler and a second one exhausted to a common stack, and the $NO_x$ measurement in the common stack in one of the two boilers with one urea injector showed a 20% reduction from 1 lb/MMBtu to 0.8 lb/MMBtu for both 37 MW boilers. A separate $NO_x$ measurement at the baghouse outlet from the one 37 MW boiler with the urea injector measured only a 26% reduction. However, the placement of this latter probe was such that it was influenced by the exhaust from the other boiler. Therefore, the actual $NO_x$ reduction was most probably closer to 40%, as there was no reduction in the other boiler. Using this 40% reduction of the $NO_x$ yielded a urea utilization of 38%. The ammonia slip at the baghouse outlet of the 37 MW boiler was only 8.7 ppm at 3% $O_2$. The urea flow rate was then reduced by 50% and the $NO_x$ reduction remained the same, namely 40% at the common stack and 26% at the baghouse outlet. Using the 40% $NO_x$ reduction number yielded a 75% urea utilization. The measured ammonia slip was then 7.6 ppm at 3% $O_2$, which was below the desired 10 ppm limit.

A second urea injector was inserted on the wall perpendicular to the one with the injector, and the urea injection rate from both injectors was the same as the level used with one injector. In this case, the $NO_x$ reduction measured at the baghouse outlet was 38%, again assuming that the $NO_x$ measurement was influenced by the stack gas from the other boiler. This corresponds to a urea utilization of 42%. The reason for the lower reduction was most probably due to the higher gas temperature in the second injector insertion point of 2250° F., which is too high for effective $NO_x$ reduction. This wide variation in the gas temperature at one elevation was due to the arrangement of the burners in this boiler.

The main conclusion from the 37 MW boiler test was that the smaller cross-section yields better urea coverage of the appropriate gas temperature region for the urea-NO reaction with the same model SU85 injector, resulting in improved $NO_x$ reduction. However, the substantial temperature variation at a specific boiler furnace elevation requires injector insertion at more than one elevation. In any case, the feasibility of this invention to substantially reduce $NO_x$ emissions in various size boiler was fully demonstrated, especially in the 37 MW boiler.

The air atomized water droplet spray or steam can be used in the crushed coal, cyclone combustor fired utility boilers (see supra, *Steam, Its Generation & Use*, Chapter 28) which must operate at excess air conditions to achieve efficient coal combustion. This results in high $NO_x$ production in excess of 1 lb/MMBtu. Lowering the combustion temperature below 3000° F. by means of water droplet injection or steam into the air ducts leading to the coal combustor will reduce the thermal $NO_x$ production rate. The droplet size must be in the 10–100 micron range because the combustion air temperature is at most in the range of several 100° F. While the total $NO_x$ reduction from this method will be small because it will not impact fuel bound $NO_x$ production, when combined with the SNCR method disclosed by this invention, it will reduce the quantity of urea or ammonia required.

While the invention has been described in terms of its preferred embodiments, those skilled in the art will recognize that the invention can be practiced with modification within the spirit and scope of the appended claims.

What is claimed:

1. A method of reducing the concentration of nitrogen oxides ($NO_x$) in an effluent gas stream from the combustion of carbonaceous fuel in a boiler or furnace, comprising the steps of:

identifying a gas combustion temperature zone within said boiler or furnace which ranges from about 1700° F. to 2000° F.;

injecting an aqueous solution into contact with an effluent gas stream in said gas combustion temperature zone within said boiler or furnace, said aqueous solution comprises a dissolved or dispersed reducing agent selected from the group consisting of urea, ammonia, and an ammonia precursor, said step of injecting being performed with at least one injector, said step of injecting being performed with a nozzle that forms a flat, planar, fan shaped spray pattern which is oriented perpendicular to said effluent gas stream;

producing droplets of a non-uniform variable size ranging from 10 μm to 1000 μm where a mean and maximum size of said droplets depend on dimensions of said furnace or boiler, said producing step taking place during said injecting step by varying hydraulic and air atomizing pressures in said injector in order to permit distribution and vaporization of different sized droplets at different locations within said gas combustion temperature zone; and adjusting a position of an injector droplet outlet of said injector within said boiler or furnace based on an outer edge of said gas combustion temperature zone identified in said identifying step, said adjusting step positioning said injector droplet outlet adjacent to said outer edge of said gas combustion temperature zone identified in said identifying step.

2. A method in accordance with claim 1, where each of the one or more injectors has an air atomizing chamber with outlets for said droplets and inlets for liquid and air and each of said one or more injectors are connected to a pressurized aqueous solution filled pipe which is parallel to a compressed air pipe, wherein said compressed air pipe is either placed inside and co-axially with said aqueous solution filled pipe, or adjacent to said aqueous solution filled pipe and in contact along external length with said aqueous solution filled pipe with said contact between the compressed air pipe and the aqueous solution filled pipe being either metal to metal or by a high thermal conductivity ceramic cement anchored to both said compressed air pipe and said aqueous solution filled pipe by means of welded metal studs placed along the circumference of both said compressed air pipe and said aqueous solution filled pipe on surfaces facing each other and where surfaces which do not face each other are coated with a low-thermal conductivity material.

3. A method in accordance with claim 2 where said aqueous solution filled pipe is perpendicular to said effluent gas stream and said compressed air filled pipe is located behind said aqueous filled pipe relative to said effluent gas stream.

4. The method of claim 2 where atomization of the aqueous liquid solution occurs in a chamber in the injector that is located at the outlet of said parallel compressed air and aqueous solution pipes.

5. A method in accordance with claim 1, wherein the concentration of said reducing agent in the aqueous solution is in the range of 1% to 25% by weight, and wherein the injection rate of reducing agent into said effluent gas stream is at a mol flow rate that is less than the flow rate of untreated NO in said effluent gas stream.

6. A method in accordance with claim 1, where said gas combustion temperature zone is determined by means of a thermocouple with a bare exposed tip that is inserted into said effluent gas stream being treated, or with a thermocouple tip that is recessed within a ceramic tube.

7. A method in accordance with claim 1 further comprising the step of inserting said injector through a pre-existing port on said boiler or furnace.

8. The method of claim 1 wherein said droplets range from 50 microns to 100 microns in diameter.

9. A method in accordance with claim 1 where said reducing agent is urea and wherein said step of injecting is implemented downstream of a primary combustion zone which is slightly fuel lean in order to reduce the release of carbon monoxide from the urea into the boiler stack exhaust.

10. A method in accordance with claim 1 where said reducing agent is urea and where the urea injection rate is limited to reduce carbon monoxide emissions from the urea into the exhaust gas.

11. The method of claim 1 wherein said flat, planar, fan shaped spray pattern is of sufficient cross-sectional area to intercept all of the effluent gas flow in said gas combustion temperature zone.

12. A method of reducing the concentration of nitrogen oxides ($NO_x$) in an effluent gas stream from the combustion of carbonaceous fuel in a boiler or furnace, comprising the steps of:

identifying a gas combustion temperature zone within said boiler or furnace which ranges from about 1700° F. to 2000° F.;

injecting an aqueous solution into contact with an effluent gas stream in said gas combustion temperature zone within said boiler or furnace, said aqueous solution comprises a dissolved or dispersed reducing agent selected from the group consisting of urea, ammonia, and an ammonia precursor, said step of injecting being performed with at least one injector, said step of injecting being performed with a nozzle that forms a conical spray pattern oriented coaxial with said effluent gas stream;

producing droplets of a non-uniform variable size ranging from 10 μm to 1000 μm where a mean and maximum size of said droplets depend on dimensions of said furnace or boiler, said producing step taking place during said injecting step by varying hydraulic and air atomizing pressures in said injector in order to permit distribution and vaporization of different sized droplets at different locations within said gas combustion temperature zone; and adjusting a position of an injector droplet outlet of said injector within said boiler or furnace based on an outer edge of said gas combustion temperature zone identified in said identifying step, said adjusting step positioning said injector droplet outlet adjacent to said outer edge of said gas combustion temperature zone identified in said identifying step.

13. The method of claim 12 wherein said conical spray pattern is of sufficient cross-sectional area to intercept all of the effluent gas flow in said gas combustion temperature zone.

* * * * *